United States Patent [19]
Kagan

[11] Patent Number: 5,904,744
[45] Date of Patent: May 18, 1999

[54] FAN FILTER WITH FASTERNING MEANS

[75] Inventor: Anton Kagan, 735 Broadway St. #222, Lowell, Mass. 01854

[73] Assignee: Anton Kagan, Lowell, Mass.

[21] Appl. No.: 08/872,499

[22] Filed: Jun. 9, 1997

[51] Int. Cl.[6] .................................................. B01D 46/00
[52] U.S. Cl. .................... 55/385.1; 55/385.2; 55/471; 55/473; 55/491; 55/492; 55/496; 55/509
[58] Field of Search ................................ 55/385.1, 385.2, 55/467, 471, 472, 473, 490, 491, 492, 496, 509; 95/268, 273

[56] References Cited

U.S. PATENT DOCUMENTS

| | | | |
|---|---|---|---|
| 2,161,027 | 6/1939 | Dollinger | 55/471 |
| 2,313,676 | 3/1943 | Shaver | 55/471 |
| 2,883,790 | 4/1959 | Blackman | 55/471 |
| 3,369,348 | 2/1968 | Davis | 55/473 |
| 4,394,147 | 7/1983 | Caddy et al. | 55/492 |
| 4,477,272 | 10/1984 | Hollis et al. | 55/471 |
| 4,676,721 | 6/1987 | Hardee | 416/146 R |
| 4,750,863 | 6/1988 | Scoggins | 55/471 |
| 4,889,543 | 12/1989 | Burt | 55/471 |
| 5,529,593 | 6/1996 | Simmons | 55/471 |
| 5,641,340 | 6/1997 | Kagan | 55/385.1 |
| 5,689,969 | 11/1997 | Conroy | 55/490 |

*Primary Examiner*—C. Scott Bushey

[57] ABSTRACT

An air filter designed to be placed at a definite distance L beyond the periphery of the primary airflow which is created by an operating fan, and attached to a stationary element of the fan or to a stationary element of an enclosed space with fasteners which are, at the same time, vibration isolation units. The present invention greatly reduces the creation and release of fine particles of soot, mold, dust mites, etc. Five modifications of the invention are described, as well as the way to determine a distance L when the fasteners are used with ceiling fans, diffusors and other conventional fans. When an operating fan with a weighted base is used, the base acts as an additional vibration dampening unit, which further limits creation of fine toxic particles.-In

11 Claims, 23 Drawing Sheets

FAN FILTER WITH FASTERNING MEANS

This invention is an improvement on the means of fastening air filters which were developed in accordance with my prior application filed Aug. 18, 1995, application Ser. No. 08/517 200, now U.S. Pat. No. 5,641,340.

FIELD OF THE INVENTION

The present invention relates generally to filters for cleaning the air within an enclosed space. More particularly the present invention relates to air filters designed to be placed at a definite distance beyond the periphery of the primary airflow which is created by an operating fan. The filter is attached to either a stationary element of the enclosed space or to a stationary element of the fan by way of at least one vibration isolation unit which, at the same time, is the means of fastening.

BACKGROUND OF THE INVENTION

Indoor air pollution is still a little understood health hazard. Especially very fine particles only 1/40 the width of a human hair pose the greatest health risk. Environmental illnesses are taking a toll upon our children and teachers day by day. Either slowly or quickly, they can progressively harm any part of the human body. Children are expected to learn not only in a lot of old school buildings which have lead paint, dust mites, asbestos, etc. inside, but which are also insulated with new windows that do not allow the entrance of fresh air into these chemicalized buildings.

Sensitivities to everything from pesticides and asthma trigger to even very small amounts of the deteriorated lead-based paint are behind many children's illnesses, behavioral learning difficulties, hyperactivity and depression problems (see, Doris J. Rapp, M.D., "Is This Your Child's World", 1996, N.Y.).

Recently, the need for fan filters rapidly increased, especially for domestic and school use because:

1. The American Lung Association estimates that about 4 million American children suffer from asthma. According to Sesame Street Parents Magazine, March, 1996, the childhood asthma rate rose 58%, and today there are an estimated 4.8 million cases nationwide. Asthma is responsible for 10 million lost school days annually, and it is a leading cause of hospital stays for most children. Asthma accounts for $5 billion in medical costs each year in the U.S. If fan filters were installed and fastened in accordance with the present invention, even in only conventional household fans (there are 500 million of them in America) it will improve the quality of life for children suffering from respiratory ailments and significantly reduce the number of allergy and asthma cases. Indoor allergens, especially those that are small in size, are one of the primary causes of asthma.

2. Another serious problem is the rapidly increasing number of children who are being treated with Ritalin and Prozac. Ritalin and Prozac (class 2 narcotics) have been found to reduce behavioral and depression problems in children. In 1993, two million school children were receiving Ritalin and Prozac (see New England Journal of Medicine, Oct. 5, 1995, p. 994). In 1995, the figure doubled to 4 million. This proves that an urgent necessity for removing from the air numerous pollutants causing depression, including the dust from lead-based paint, mold, fungus, etc., which affect the behavior, health and nervous systems of children.

BRIEF DESCRIPTION OF THE PRIOR ART

Known in the art are teachings relating to air cleaning units, air pollution reduction units and fastening devices for filters for use in such units.

One example of a device for reducing the pollution in the air in a room equipped with a conventional household fan is shown in U.S. Pat. No. 4,477,272. As described therein, a filter used in conjunction with a motor driven fan is mounted on the cage which covers the fan blades. The filter has a configuration similar to that of the cage and has a slot extending from its outer periphery to its central area to permit the filter to be slipped over the motor. The cage and filter are disposed on the intake side of the fan. The fastening devices for the filter on the fan stretch the filter on the surfaces of the fan parts. The filter clings close to them, i.e., it fits snugly to the sources of vibration: the motor housing and cage. In this invention the fan filter completely absorbs all mechanical vibration formed in the fan motor, motor housing, cage, and fan blades. The dust particles trapped inside the filter collide with each other under the influence of vibration.

As a result the dust particles (for example, from lead-based paint, mold, pesticides, etc.) break up into smaller pieces, i.e., 0.25 micron and smaller, and thereby increasing in number. In addition, under the influence of vibration, the filter starts to excrete the dust accumulated in it; at first, it is fine dust. Under the influence of vibration, the filtering material loses the ability to retain the dust. Then the vibration shake small particles out into surrounding air spaces: school classrooms, operating rooms, food processing facilities, hospitals, medical clinics, doctors offices, etc. Studies have shown that very fine dust with dimensions of 0.25 microns and smaller is the most dangerous for human health and behavior. Small allergens and other toxic particles cannot be "washed" by mucous, coughed or sneezed or otherwise filtered out of or expelled from a person's body; they pass through the thin membranes of the lungs into the blood stream and then into the brain.

There is similar behavior in a fan filter according to U.S. Pat. No. 4,477,272, described above, applies to all air filter devices known in the prior state of the art as well (see, for example, U.S. Pat. No. 4,889,543 and U.S. Pat. No. 4,889,542).

Hence, all known air filters under the influence of vibration create very fine toxic particles. Thus wherever fan filters are placed, for example, in a classroom, the children have a very high risk of getting environmental illnesses: asthma, lead poisoning, depression (which can be responsible for a child's gravitation toward drug use), behavioral, emotional and learning problems.

The problem with indoor air pollution across the country, especially in schools and homes, can be solved only when we find new acceptable solutions for air filtering devices which can easily be used with any of 2 billion units which Americans already have in everyday use: conventional fans, fans inside computers, ceiling fans, air conditioners, all ceiling openings (e.g., vents and diffusers), etc.

These air filters must correspond with the following requirements:

1. Reduce vibration in the air filter. Vibrating air filters release previously airborne particles and create dangerous smaller particles.
2. Air filters with a means of being fastened.
   None of the prior art references teach that an air filter unit wherein there is a means of fastening the same to reduce mechanical-vibration can be easily made for use at home and in school.

Vibration isolation suggests physical separation (i.e., set apart) of the air filter from the source of vibration, for example in a conventional household fan. In that case, it is necessary to prevent the contact of the filter media with the vibrating units: electric motor, fan housing, protective cage, duct behind vent, etc., and place the vibration isolator or any resilient medium between the sources of vibration and the air filter.

In the present invention because the filter media is positioned beyond the primary turbulent airflow and has improved fastening means which at the same time is the vibration isolation unit, the mechanical vibration and airflow velocity in the filter media is significantly reduced.

SUMMARY OF THE INVENTION

The primary objective of the present invention is to provide practical answers to the following questions relative to indoor air pollution: How can we fix the schools and houses that are making our children sick? What solutions are fast, safe, easy, and inexpensive?

Other objectives are as follows:
1. To provide for a simple, less expensive, maximum efficient fastening means for a fan filter which permit the ordinary homeowner to convert a household fan for use, either temporarily or permanently, as a filter for clean air in enclosed space;
2. To provide a novel device to facilitate fastening of the filtering element to either a stationary element of the enclosed space or to a stationary element of a fan and which at the same time serve as a vibration insulation unit;
3. To provide an air filter with universal fastening means (devices) that could be used with different sizes and models of fans already in existence on the market and also in the schools, offices, homes, school cafeterias, hospitals, work places, U.S. Army, etc.;
4. To provide a filtering system with fastening means which is inexpensive to manufacture and can also be hand-made at home, school, work places, hospitals, etc., and so mass distribution of them would be guaranteed in a short period;
5. To provide a fan filter with fastening means which will diminish the airborne contaminants but provide invariable in the rate and volume of air flow from the operating fan and wouldn't reduce the cooling effect of the fan system provided by the manufacturers; and
6. To provide a filtering system which accommodates a filtering system the use with any kind of filtering material (for example from activated carbon) and any resistance to air flow including filters which offer considerable resistance to air flow (for example HEPA filter) without affecting the productivity of the fan.

BRIEF DESCRIPTION OF THE DRAWING FIGURE

The invention will be better understood by an examination of the following description together with the accompanying drawings in which.

Like numerals refer to like parts throughout the several views. In all parts of this specification the names of two part VELCRO fasteners: "hook-threaded sheet and loop-threaded sheets" can be substituted for "loop-threaded sheets and hook-threaded sheets".

DETAILED DESCRIPTION OF THE PREFERRED EMBODIMENTS OF THE INVENTION

Figure 1:
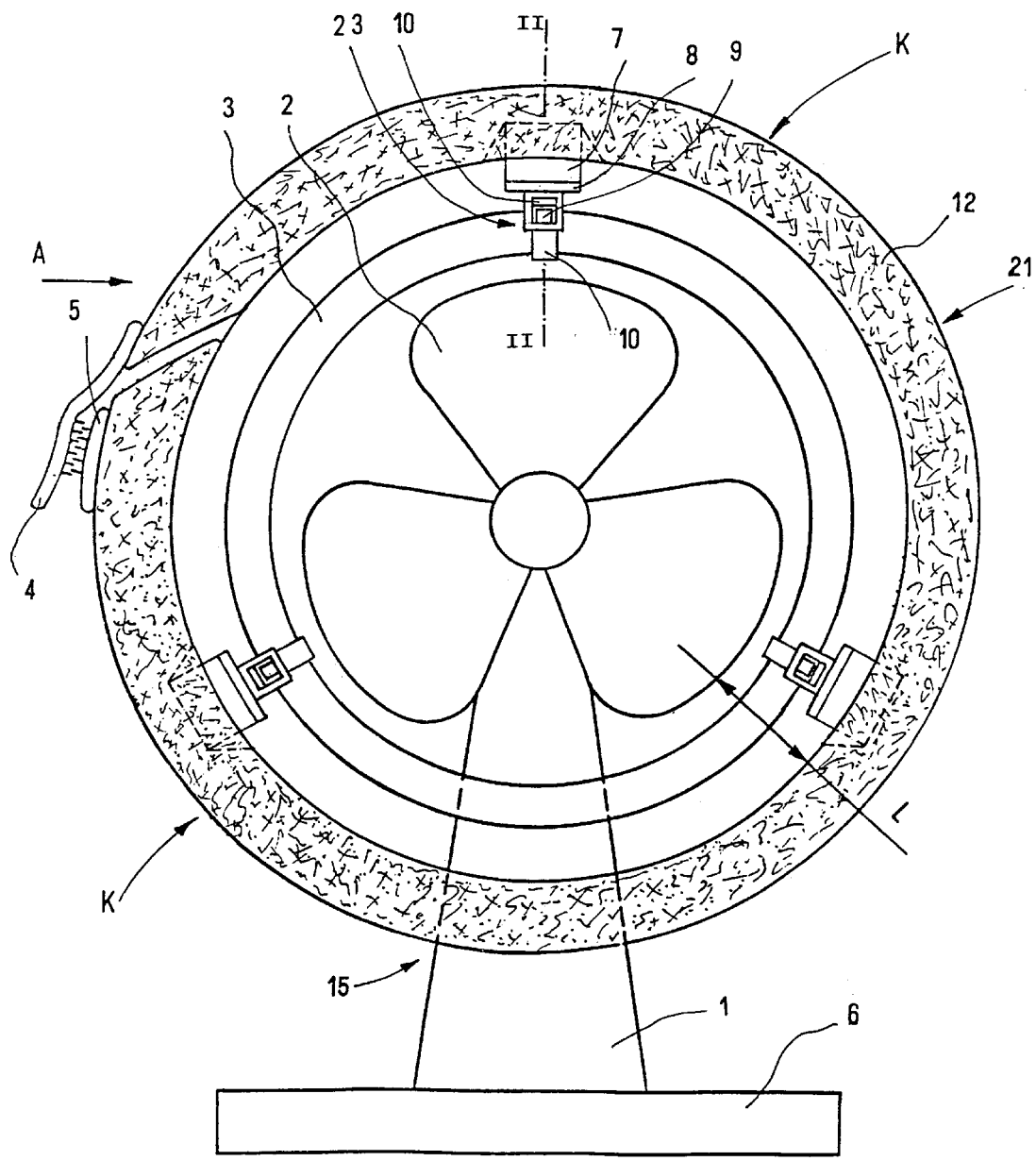
FIG. 1 is a frontal view of the fan filter with fastening means of first modification installed on a 7" conventional household fan represented on a 1:2 scale. The bars of the front and rear portion of the cage being omitted for clarity.

Referring more particularly to the drawings wherein the showings are only for purpose of illustrating some preferred embodiment of the present invention but not for the purpose of limiting same.

Figure 2:
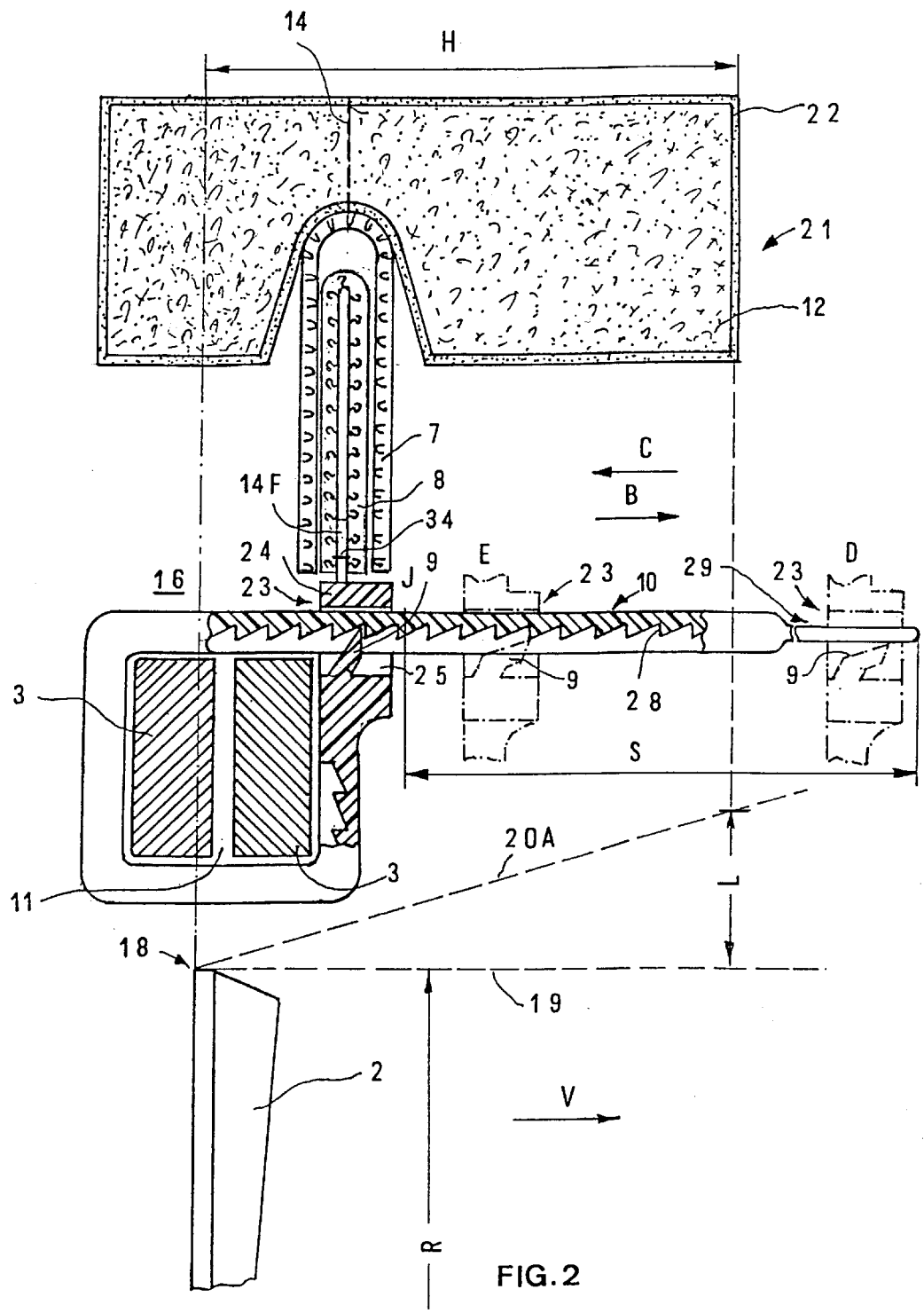
FIG. 2 is an enlarged fragmentary cross-sectional view taken along lines II—II of FIG. 1 showing upper portion of the fan filter with fastening means such that fastening means in its closed position.
Figure 3:
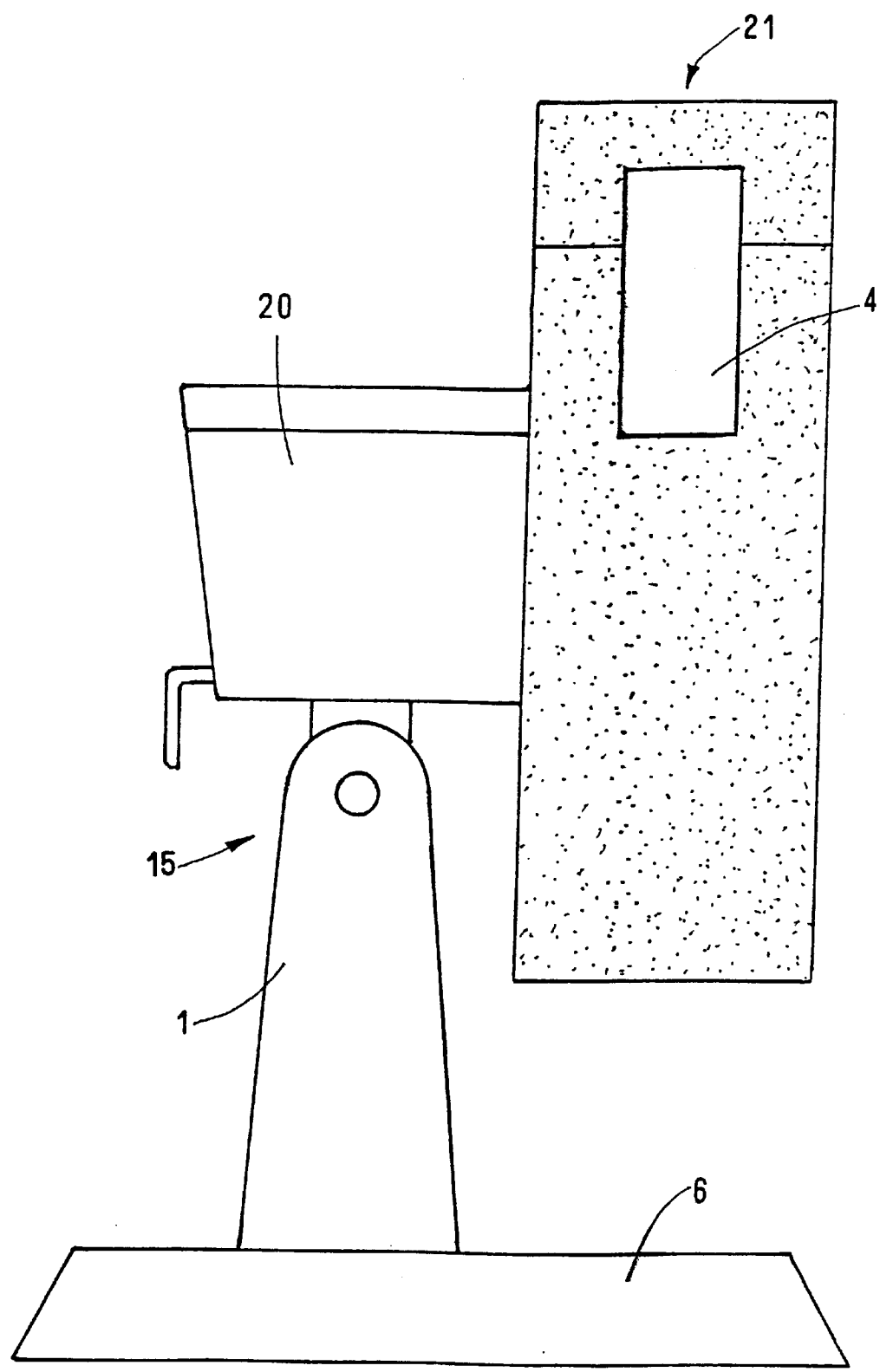
FIG. 3 is the lateral view toward the fan filter of FIG. 1 as indicated by the arrow A.

The fan filter with fastening means is shown in FIGS. 1 to 5. It comprises, in general, a fan 15 having base 6, protective cage (not shown) which have bars 17 (shown in FIGS. 12, 15) and rings 3 which have rotated blades 2 with motor 20 to create a primary airflow along the arrow V within enclosed space, elongated member 1 which is secured to a motor 20 at the one end and to a base 6 at the other; filter 21 comprising filter media 12 having width H measured in direction parallel to primary airflow axis, cover 22, and loop-threaded sheet 7 which is one part of Velcro fastener. It is sewn to the filter media 12 in place indicated by dotted line 14 and used to secure the fan filter 21 to the fastening means 16; fan filter has to be positioned at distance not less than L beyond the periphery of rotated blades 2. The ends of the filter 21 are joined together also with the help of two parts of Velcro fasteners 4 and 5. L being measured perpendicularly to the primary airflow axis. The way of determining distance L follows:

Going from fan blades, in the direction indicated by arrow V the primary airflow dilates. The angle of the airflow increases from 5° to 7° from the air stream axis. In FIG. 3 this is the angle between lines 19 and 20A which is determined by experiment. Although a 15° angle does not occur, this angle is used in calculations in order that turbulent airflow, caused by fan, does not have to touch the filter media 12. This is a safety consideration: the filter must not touch the turbulent airflow coming from fan blades 2 because that can cause unwanted vibration of filter 21 which can create very dangerous small toxic particles. From the drawing shown in FIG. 2, we get $$L = tg15°\ (H) = 0.26\ (H) \qquad \text{Equation 1.}$$

Hence, filter 12, in accordance with present invention, has to be positioned at distance not less than 0.26(H), where H is the width of the fan filter. As one can see, filter 21 is practically positioned at a greater distance, because ring 3 impede to set the fan filter at distance L. Obviously, when some device in air filtering system, according present invention,—protective cage, grill, housing, vibration isolator unit, fastening means, etc.—can considerably impede to set the filter at distance L which is defined according to Equation 1. The same condition can happen when primary airflow enters into the room at an angle (see, fan filter for diffusor grill/grill outlet/,FIG. 26). In these cases it will be necessary to increase the distance L. It is within the skill of the artisan to determine the optimum of the distance L, taking in consideration the Equation 1 and the fact that the invented air filter should be placed beyond surface of primary airflow and should not touch it, and also the fact that with L>2R the efficiency of working filter decreases more than by 60%. FIGS. 1, 2, 3 permit to realize what forces polluted air to pass through filter media 12 when the fan 15 is on. The air which was immovable inside the filter 21, starts to move along the arrow V. Here comes the primary airflow with the initial radius R.

According to Bernoulli principle, the pressure of air on a surface inside the filter 21 decreases because the air moves. Hence the pressure of the air under filter 21 is less than the atmospheric pressure outside. As a result of this pressure differential a P, a part of the air, where the fan 15 is installed, will come into the filter along the arrows K and be purified. Experimentally, it is stated, that the said pressure differential P does not exceed more than from 0.01 to 0.2 inch of water. Data check agrees with those found by experiment (in more detail see U.S. Pat. No. 5,641,340). For some practical purposes can be used next pressure differential data from different size conventional household fans (Table 1).

TABLE 1

The pressure differential Δ P (or resistance to airflow) is measured in inches of water

|  | Fan speed number | | |
| --- | --- | --- | --- |
|  | 1 | 2 | 3 |
| Boxer fan for personal computer 3-½" | 0.01 to 0.025 | | |
| Personal desk fan from 5" to 8" | 0.025 | | 0.1 |
| Table and stand fans from 10" to 18" | 0.04 | 0.1 | 0.15 |
| Pedestal fan 30" | | | 0.2 |
| Ceiling fan 54" and diffusor | 0.025 | | |

In all cases the pressure differential data can be easily obtained with aid of the manometers. With the pressure differential between the outside of the air filter 21 and the inside of the air filter 21 located near the fan blades, we have all the necessary information required for the appropriate air filter material from manufactures tables (see, for example, Technical product function sheet, Foamex Co., "Filtering Function", 1500 East Second Street, Endystone, Pa. 19022) When the material of the filter and its thickness are selected i.e. these which provide the reduced air velocity or laminar nature of the airflow, we can determine the width H from Table 2.

Table 2 shows the recommended width H of different filters and the proper distance L from the edge of the periphery of the fan blades through which the air stream goes.

TABLE 2

| Dimension of fan in inch | 3½ | 6 | 8 | 10 | 12 | 16 | 18 | 30 to 54 |
| --- | --- | --- | --- | --- | --- | --- | --- | --- |
| Radius of fan blades or round or rectangular slot (R or Re) in cm | 4.5 | 7.62 | 10.16 | 12.7 | 15.25 | 20.32 | 22.86 | 38.1 to 69 |
| Width of filter (H) in cm | 3 to 4.5 | 5 to 6 | 5.5 to 6.5 | 6 to 7 | 6 to 7 | 7 to 8 | 8 to 9 | 9 to 15 |

TABLE 2-continued

| L = 0.26 × H in cm | 0.8 to 1.2 | 1.3 to 1.6 | 1.5 to 1.7 | 1.6 to 1.9 | 1.6 to 1.9 | 1.9 to 2.1 | 2.1 to 2.4 | 2.4 to 4 |
|---|---|---|---|---|---|---|---|---|

For rectangular slot (including a lot of conventional fans which have rectangular housing) equivalent radius must be used:

$$Re = 0.565\sqrt{F}$$

Where $R_e$ is equivalent radius and F is area of rectangular slot

The filters which are manufactured allowing for the recommendations of the Table 2 are strong enough to be self-supporting, therefore the vibration isolator unit which, at the same time, is the fastening means, can be directly fastened to the filter media. Each fastening mean comprise a hook-threaded sheet 8 (or loop-threaded sheet) secured (with the help of elastic bonding adhesive or staple 34) at the one end to the stop zone 23 which have, for this purpose, a flag 14F. The stop zone 23 includes: said flag 14F, an enlarged head portion 24 having a rectangular slot 25 with stop pawl-like tooth mean 9.

The other end of the stop zone 23 is secured to the one end of the elongated strap portion 10 with plurality equality spaced stop element 28. Pawl-like tooth 9 serve for engaging the stop element 28 and arresting the strap 10 when the strap is extended through the said rectangular slot 25 soon after the elongated strap portion 10 was wrapped around objects: to either stationary element of the enclosed space or a stationary element of a fan. The free end of the elongated strap portion 10 connected with the tail portion 29 which facilitates initial insertion of the strap 10 into the rectangular slot 25. The tail portion 29 have plurality of small teeth 30 for prevention slipping the fingers, when we pool the tail 29 tighter around objects. The strap 10 had to be drawn taut and its surplus end portion (FIG. 2, surplus end portion S) severed with the help of a special hand tool (scissors, knife, etc.). In this condition the locking device (the pawl-like tooth 9) which previously has permitted movement of the strap 10 in an insertion direction (arrow B, FIG. 2) prevents movement of the strap 10 in the withdrawal direction (arrow C, FIG. 2). In the specific case of FIGS. 1 to 3, elongated strap portion 10 was wrapped around two rings from protective cage. It can be also wrapped around one ring 3 only because the clearance 11 between two rings 3 in almost all sizes of conventional fans easily permit placement of the straps with thickness of 0.8 to 1 millimeter.

With reference to FIG. 2 it can be seen how works pawl-like tooth 9: it is flexibly rotatably movable within the head 23 upon insertion of the tail portion 29 and strap portion 10 through rectangular slot 25 as shown in broken lines at D and E; the pawl-like tooth bite into the stop element 28 upon attempted withdrawal of the strap 10 as shown in full lines at J.

Sometimes, small pliers can be used for drawing up the strap 10 more tightly.

Fastening means, according to present invention, can have a pawl-like tooth made from the steel and is permanently embedded in the head portion 23. this construction exhibits high long-term pull-out resistance.

Figure 5:
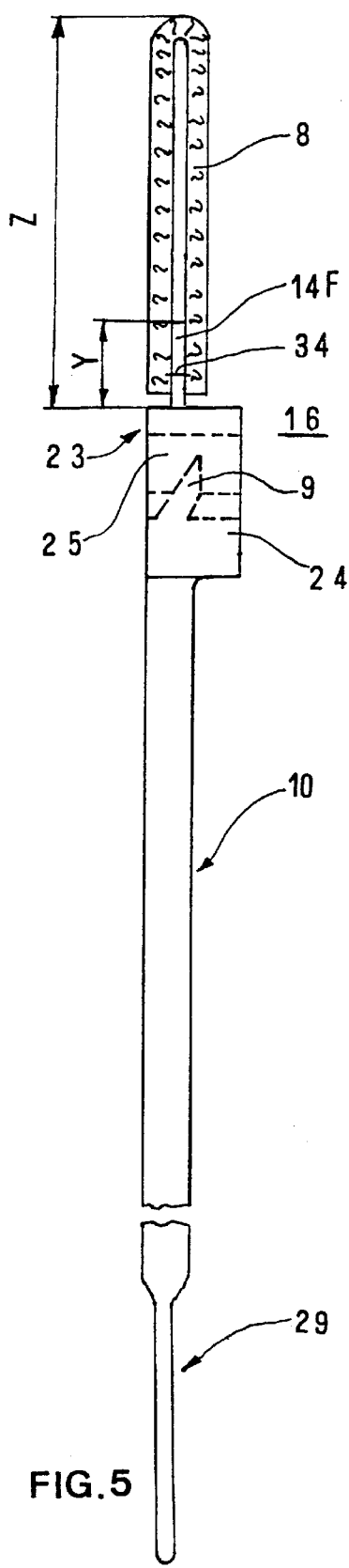
FIG. 5 is the lateral view toward fastening means of FIG. 4 as indicated by the arrow B. Manufactured as an injection molded, two pieces unit formed of flexible plastic material.
Figure 4:
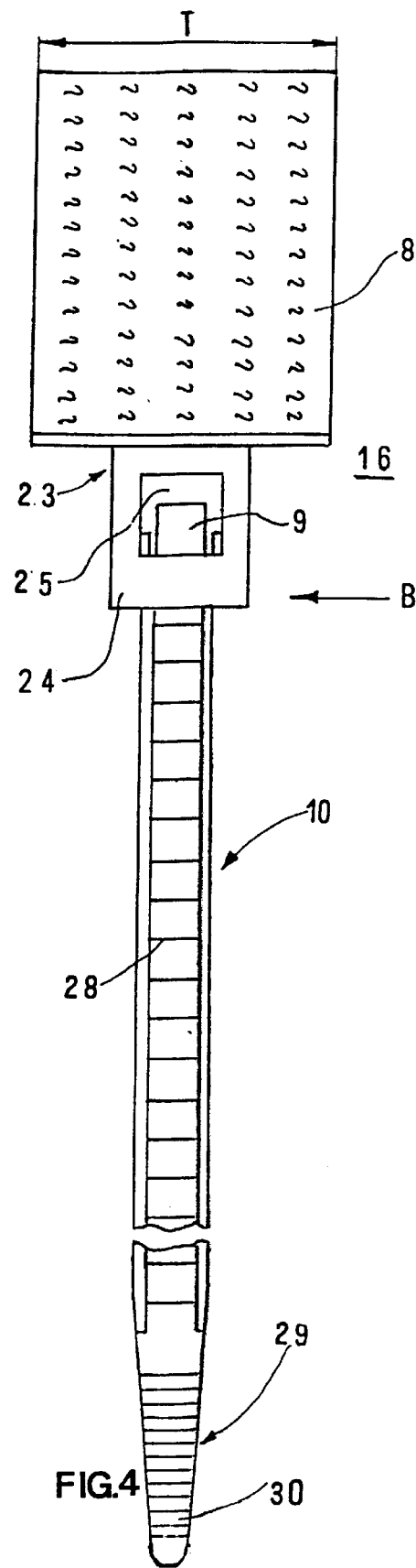
FIG. 4 is a frontal view of the fastening means in its open position.

Fastening means, shown on FIGS. 4 and 5, can be, in future, manufactured as an injection molded, one piece unit formed of plastic material. Because the fastening means 16 shown in FIGS. 4 and 5 comprises two pieces which are available commercially, it can be easily manufactured under home, school, hospital and work place conditions: Velcro fasteners are on the market in fabric stores, cable tie (or nylon wire tie) which include flag 14F, head portion 23, strap portion 10 and tail portion 29 are commercially available in electric or Radio Shack stores (Catalog NELCO Products Incorporated, cable ties, part number N-4-18FL, electric store or Catalog Radio Shack, universal cable and wire markers, part number 278-1640, Radio Shack stores). It is advisable to apply the part No. 278-1640 together with heavy duty parts of Velcro fasteners (Velcro U.S.A. Inc., Manchester, N.H. 03108) to big fans used in subway or pedestal fans (see FIG. 16) and ceiling fans (see FIGS. 17 to 19). It has to be noted that the part No. 278-1640 is a beefed-up version of the part N-4-18fl, because the part No. 278-1640 has in the head portion 23 double pawl-like tooth and applicable strap portion 10.

Hook-threaded sheet 8 is secured to flag 14F with the help of elastic glue or staple 34. Flag 14F must have the height no more than Z=8 millimeter (see FIG. 5); hook-threaded sheet 8 must have height Y=from 12 to 20 millimeter, and width T=from 20 to 60 millimeter and more. The big values of the width are recommended for the ceiling fans and diffusers. Cover 22 (if needed) is from screen, filter media 12 can be made from any filtering material, especially from ½ inch thick pad of 30 to 90 pores-per-linear-inch (ppi) SIF. This air filter foam has low air resistance and large dust-holding due to the 97 percent void volume, manufactured by Foamex Co., Technical Products Group, 1500 east Second Street, Eddystone, Pa. 19022, tel. 1-800-767-4997.

Referring now to the drawing and, in particular, to FIGS. 1 to 2 wherein there is illustrated that a loop-threaded sheet surface 7 from filter media 12 a hook-threaded sheet surface 8 from fastening means 16 when pressed together serve for two goals: for securing the filter media and for isolating fan filter from vibration. Made from flexible plastic material head portion 23 and elongated strap portion 10 also serve for these two goals.

As can best be seen in FIG. 2, two sides hook-threaded sheet 8 provides reliable security for fan filter 21. The combination of the holding magic of self-locking devices (wire ties) and holding magic of two parts of Velcro fastener as applied to filters which positioned beyond the external surface of primary airflow from working fan have numerous advantages over the prior art structures. Disclosed fastening means for fan filters are universal because they can be applied to a great variety of units which have working fans. Placing the filter media 12 at a definite distance beyond the surface of primary airflow permit include as a part of filter media 12 the filter material of any property. Because the propeller type fan's characteristics, i.e. a curve shoving the relation between pressure and delivery do not change. For example, we can use as filter material, a foam impregnated with activated carbon.

With activated carbon either alone or in combination with an absorbent of bacteriostatic media, invented air filter become powerful carbon absorption system.

The system with activated carbon can provide:
purification of the air from specific harmful pollutants;

reducing bacterial growths in air;
removal of mercury vapor from air;
removal of ammonia from air;
reduction of formaldehyde vapor present in air;
odor control: occupancy odor, tobacco smoke odor, and even the odor of dust;
high quality air purification.

Activated carbon is characterized by very large surface area per unit volume, because of an enormous number of pores.

Figure 6:
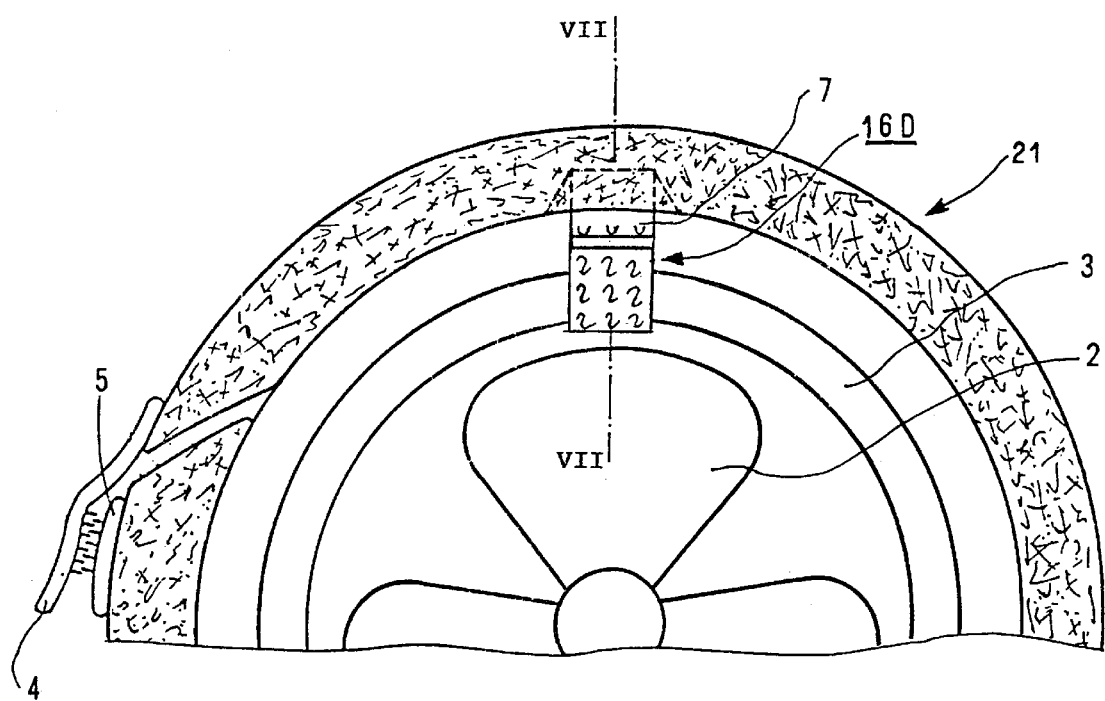
FIG. 6 is a fragmentary frontal view of the fan filter with fastening means of second modification.
Figure 7:
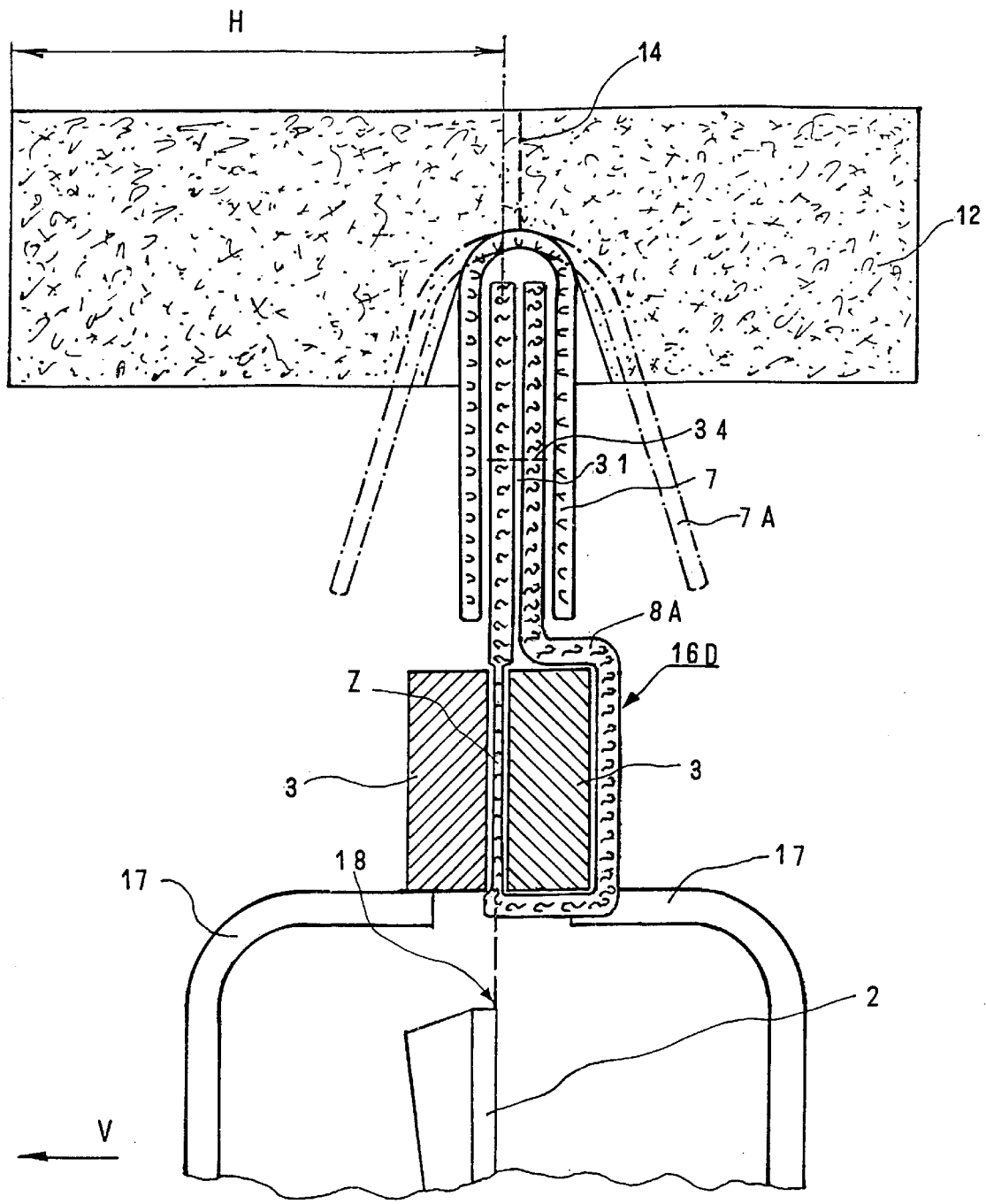
FIG. 7 is an enlarged fragmentary cross-sectional view taken along lines VII—VII of FIG. 6 showing upper position of the fan filter with fastening means in its closed position.
Figure 8:
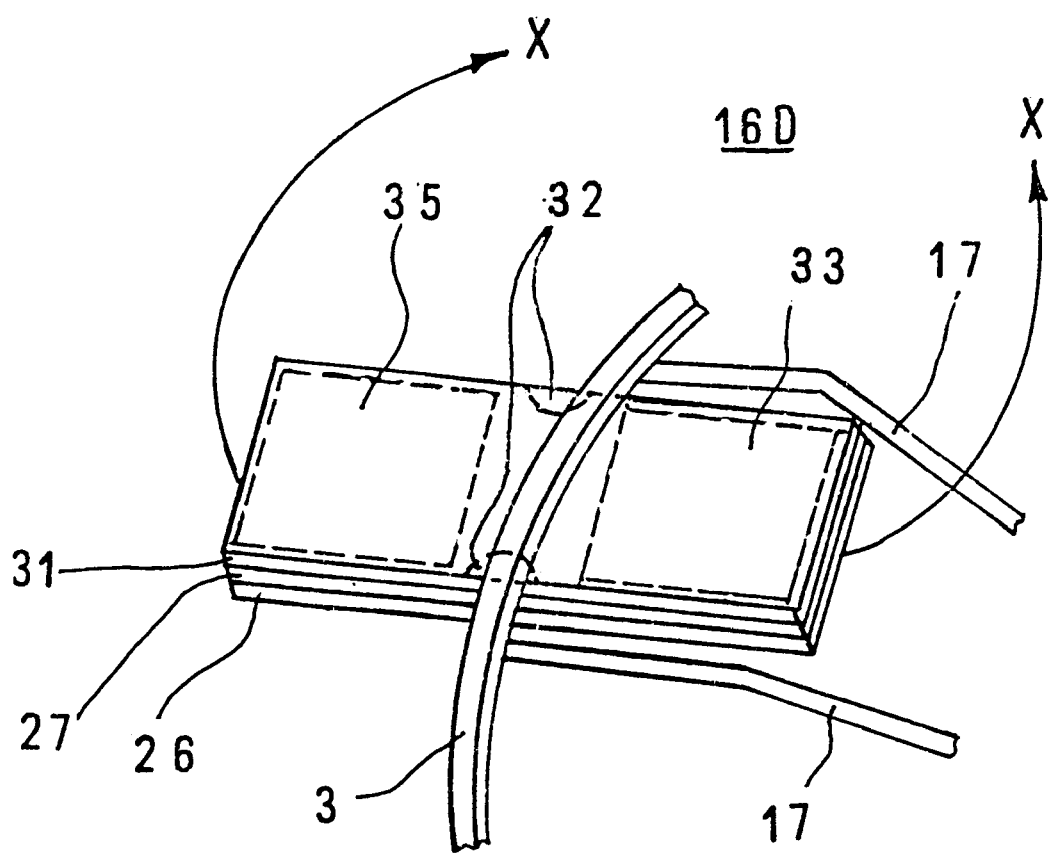
FIG. 8 shows a perspective schematically illustrated view of a portion of the fan when the fastening means of second modification are inserted between the bars.
Figure 9:
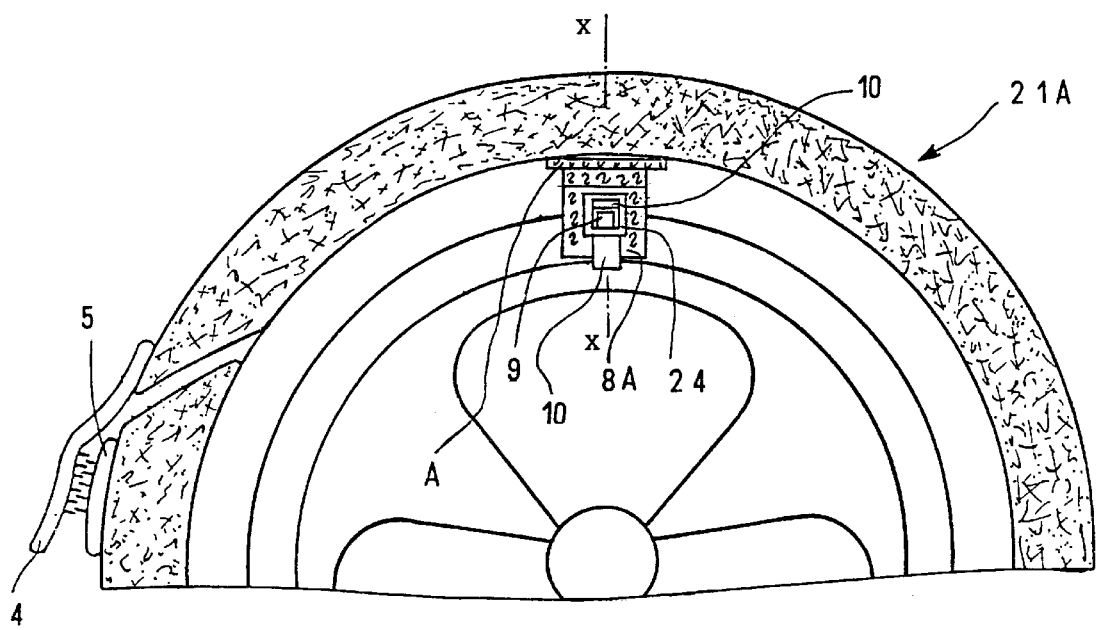
FIG. 9 is a fragmentary frontal view of the fan filter with fastening means of third modification.

For getting more opportunity for every home, office and school independently to make present invention and in this way avoid environmental illness, in FIGS. 6 to 8 shown fastening means made only from two part of Velcro fastener. This fastening means less universal, requires more time for manufacturing, but can be useful in many cases, for example, for two 6" fan filters inside a school bus. FIG. 6 is a fragmentary frontal view of the fan with fastening means 16D.

FIG. 8 shows a perspective schematically illustrates view of a portion of the fan when the fastening means 16D is inserted between the bars 17. FIG. 8 called schematically because for illustrative purpose the thickness of the part 18, 26, 27 and 31 were enlarged. We can see, that fastening means 16D comprise a hook-threaded surface portion 26 and a knitted back portion 27. Knitted back portion 27 can contain elastic bonding adhesive 31. In some cases knitted back portion 27 can also contain two part VELCRO fasteners: the rough hook surface 35 (shown in dotted line) and fuzzy loop surface 33 (shown in dotted line). Approximately fastening means 16D in its open position is 20 millimeter in width and 50 millimeter in length.

Two portions 32 from fastening means 16D can be cut away in case when distance between the bars 17 less than 20 millimeter. This facilitates easy insertion of the fastening means 16D between the bars 17. Fastening means 16D formed in closed position when it wrapped around guard ring (or rings) 3 in direction the arrows X and perpendicularly to primary airflow axis such that two equal halves or hook-threaded surfaces 26 facing out and two equal halves of knitted surfaces 27 facing in. Two equal halves of knitted surfaces attached together with the help of elastic bonding adhesive 31 and staple 34 (FIG. 7) or two part of Velcro fastener 35 and 33, which in one's turn can be glued or sewn on knitted surface 27.

FIG. 7 is an enlarged fragmentary cross-sectional view taken along lines VII—VII of FIG. 6. As shown in FIG. 7 the loop-threaded sheet 7 secures (glued or sewed) to the interior surface of the filter media 12. The hook-threaded surfaces 26 from fastening means 16D, when pressed together with the loop-threaded surface 7 Serves for two goals: for securing the filter media 12 to guard ring (or rings) 3 of fan and for isolation fan filter from vibration. This joint provides a simple less expensive efficient fastening means 16D for fan filter, which permit the ordinary household to convert fan for use, either temporarily or permanently, as a filter for cleaning the air in enclosed area. In FIG. 7 the initial placement of the loop-threaded sheet 7 is shown by a dotted line.

FIGS. 9 to 12 show acceptable fastening means 16A which uses nylon wire ties 4" (101 mm) long, Radio Shack catalog No. 278-1632. There are Radio Shack stores in every place in America. Design of fastening means 16A and filter 21A (FIGS. 9 to 12) is identical to fastening means 16 and filter 21 (FIGS. 1 to 5) with the exception of two slots 17 which have in hook-threaded sheet 8A and the flat form of loop threaded sheet A which is secured to filter media 12. Mushroom-shaped form of hook-threaded sheet 8A acquired after filter 21A with loop threaded sheet A is put on the fastening means 16A.

Figure 10:
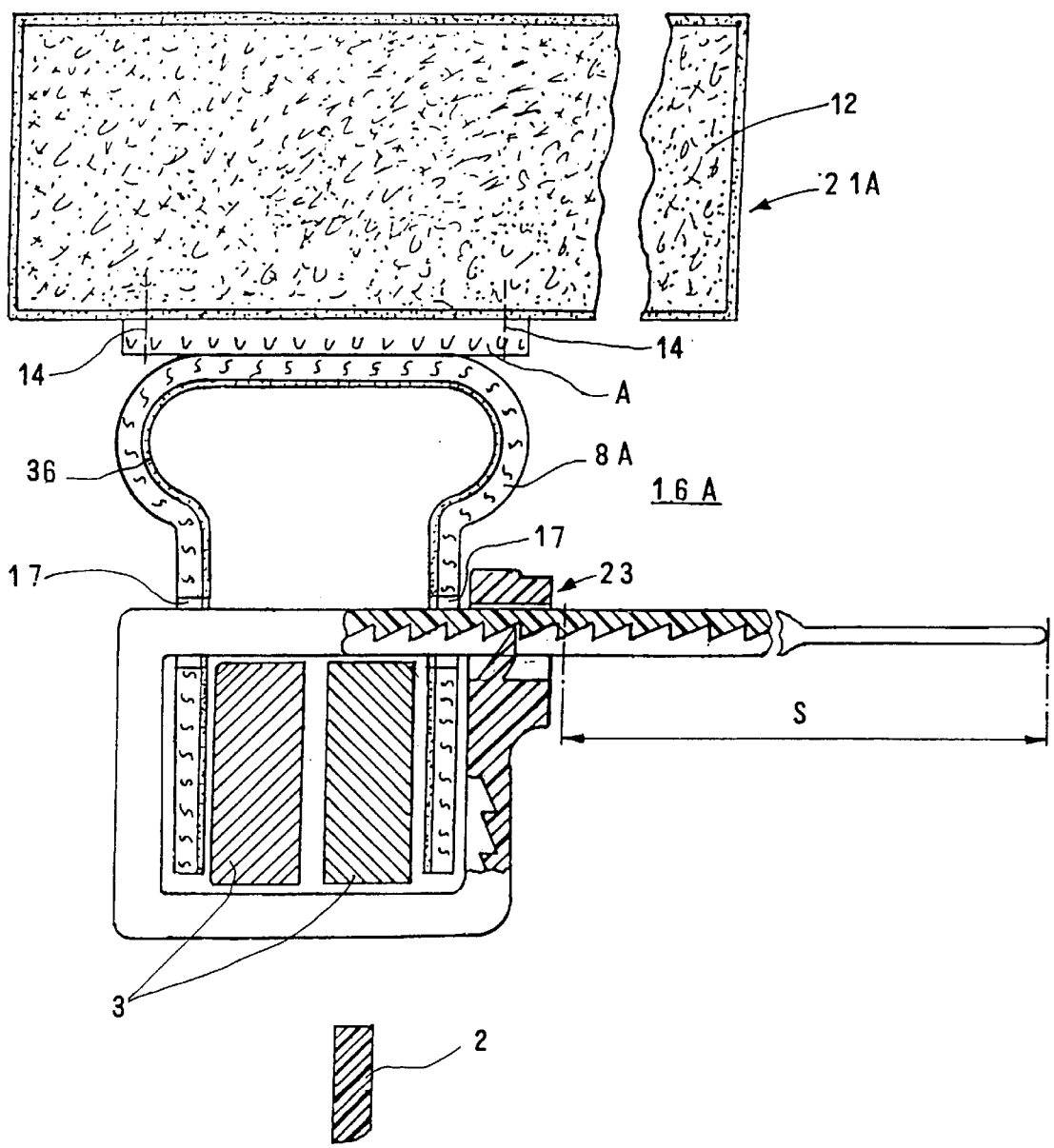
FIG. 10 is an enlarged fragmentary cross-sectional view taken along lines X—X of FIG. 9.
Figure 12:
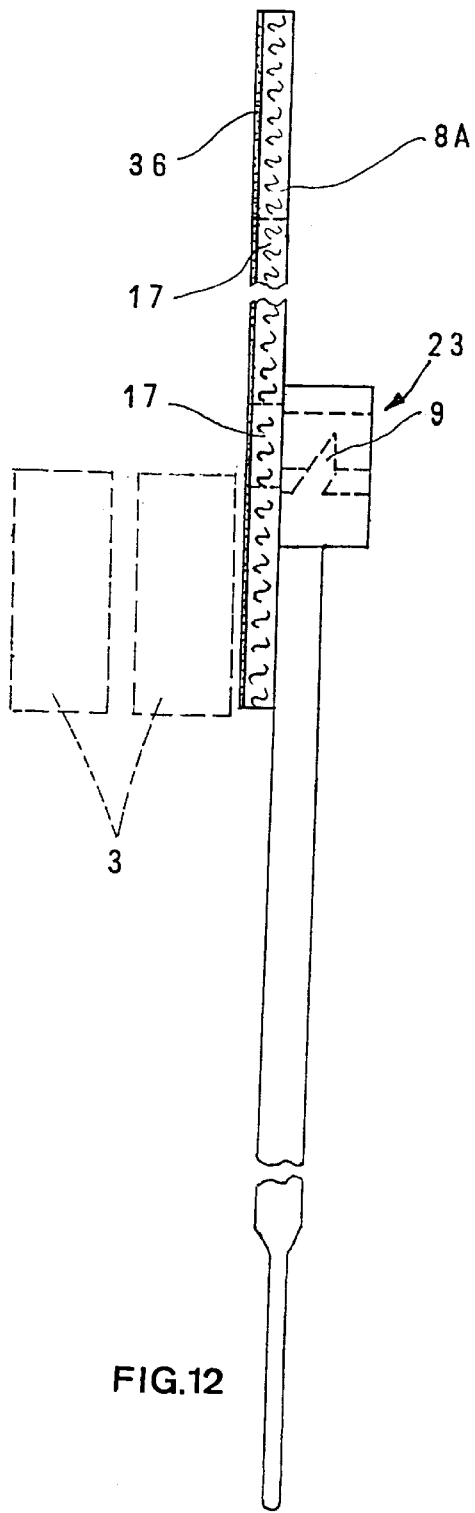
FIG. 12 is the lateral view toward fastening means of FIG. 11 as indicated by the arrow C in FIG. 12. Hook-threaded sheet 8A attached (glued on) to head portion 23 preliminary for ease of handling.
Figure 11:
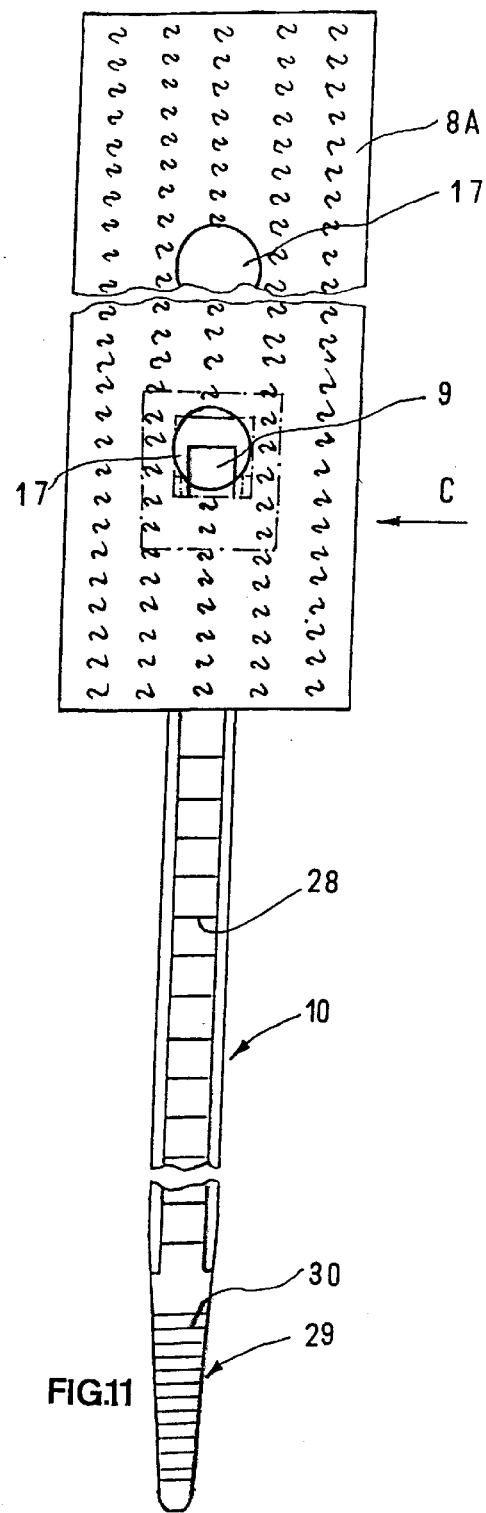
FIG. 11 is a frontal view of the fastening means in its open position (third modification).

The strap 10 in FIG. 10 work in the same manner like the strap 10 on FIG. 2. Hook threaded sheet 8A in FIG. 12 is secured (glued on) to head portion 23 preliminary for ease of handling. Termination securing the hook threaded sheet 8A to head portion 23 will take place after when strap 10 was passed through two slots 17 and rectangular slot 25 (see FIG. 10) as far as strap 10 will go. Therefore simultaneously the strap 10 secure the part 8A to head portion 23 and guard rings (or ring) 3 FIGS. 9–10). Obviously holding ability between fastening means 16A and filter 21A in case shown in FIG. 10 is less than in case shown in FIG. 2, because of flat form other loop threaded sheet A, but mass introduction of present invention in practice will be considerably wider. Because the filters 21A (FIG. 10) and 21 (FIG. 2) hold in place by really detachable fastening, such as hook and loop fasteners (part numbers A, 8A, 7, and 8) so that the filters 21A and 21 can be removed easily for cleaning. Paper spacer 36 glued to hook threaded sheet 8A help to keep a mushroom-shaped form.

Figure 13:
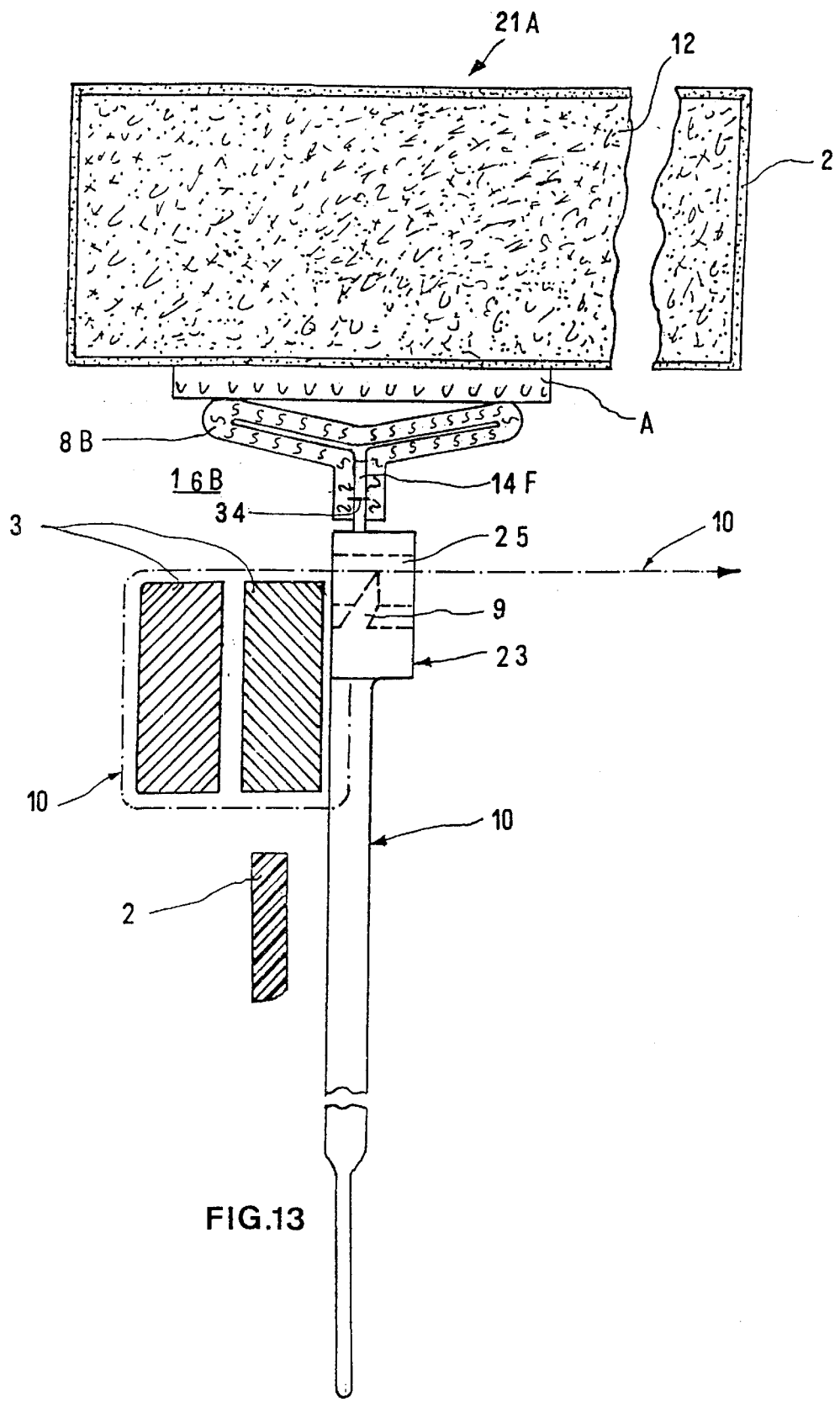
FIG. 13 is cross-sectional view of the fan filter with fastening means of the fourth modification.

In FIG. 13 we can see the fan filter 21A with fastening means 16B made with use of cable tie part number N-4-18FL flag), where the hook-threaded sheet 8 B has mushroom-shaped form. It has to be noted that the work in common of the fan filter 21A and the fastening means 16B is the same as it was described above concerning FIG. 10. The mushroom-shaped form of the hook-threaded sheet 8B (FIG. 13) is achieved with help of staple 34 and glue 31 (Velcro brand adhesive, Velcro U.S.A. Inc. 406 Brown Ave, P.O. Box 5218, Manchester, N.H. 03108 The other designations of the parts in FIG. 13 are the same as in FIGS. 2 and 10.

Description of the use of cable tie N-4-18FL in common with hook-threaded sheet for create the mushroom-shaped form is made in intention to consider, as an example, the opportunity of using, with for this purpose, the different materials.

It is determined that the base 6 of the fan 15 is least of all the subject of vibration. Therefore, to fasten the fan filter to the base 6 is required. Made from light plastic, the base has to be weighted.

Figure 14:
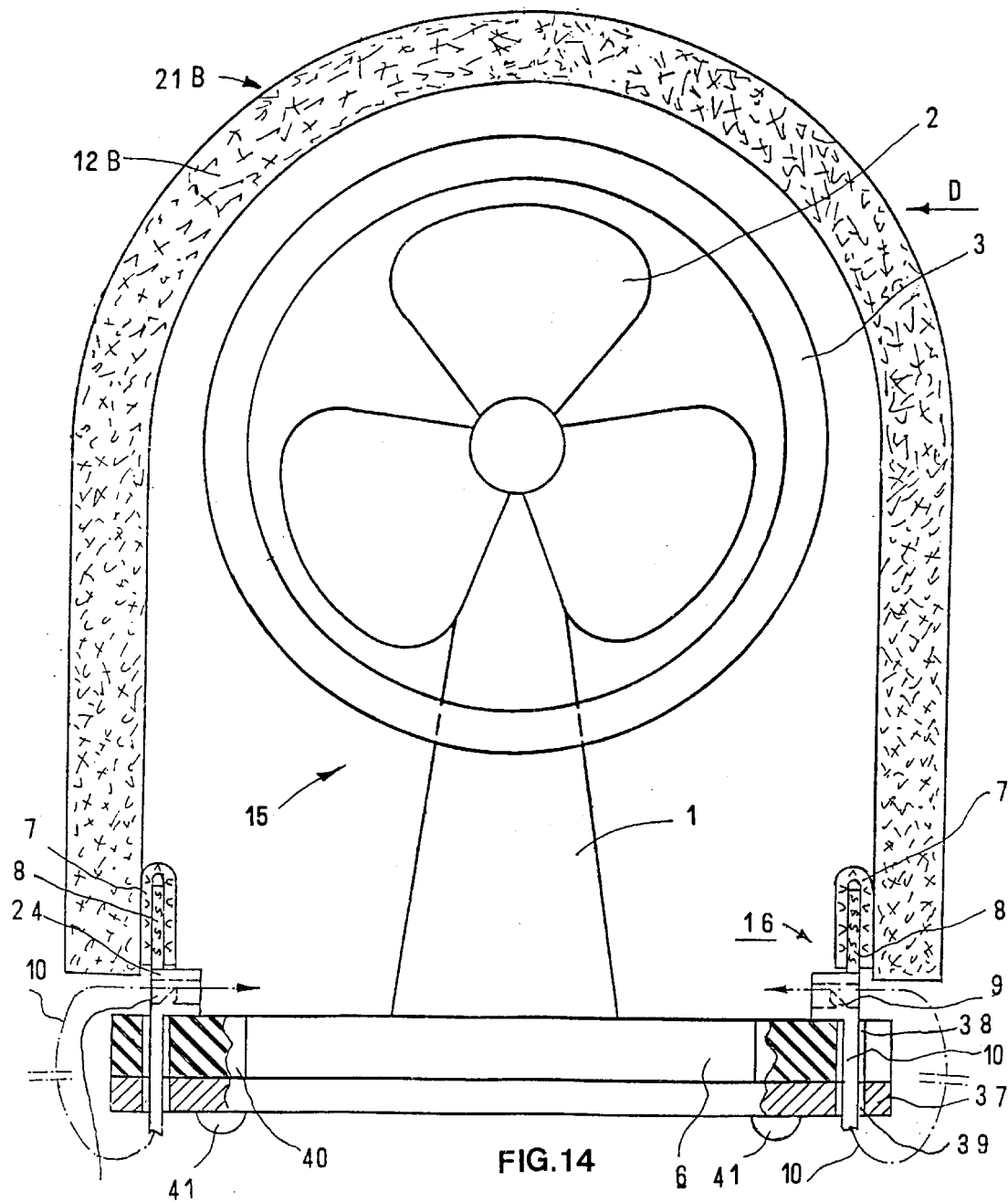
FIG. 14 is fragmentary sectional view of the fan filter with fastening means of the first modification, in accordance with present invention, attached to the fan base having additional weight.
Figure 15:
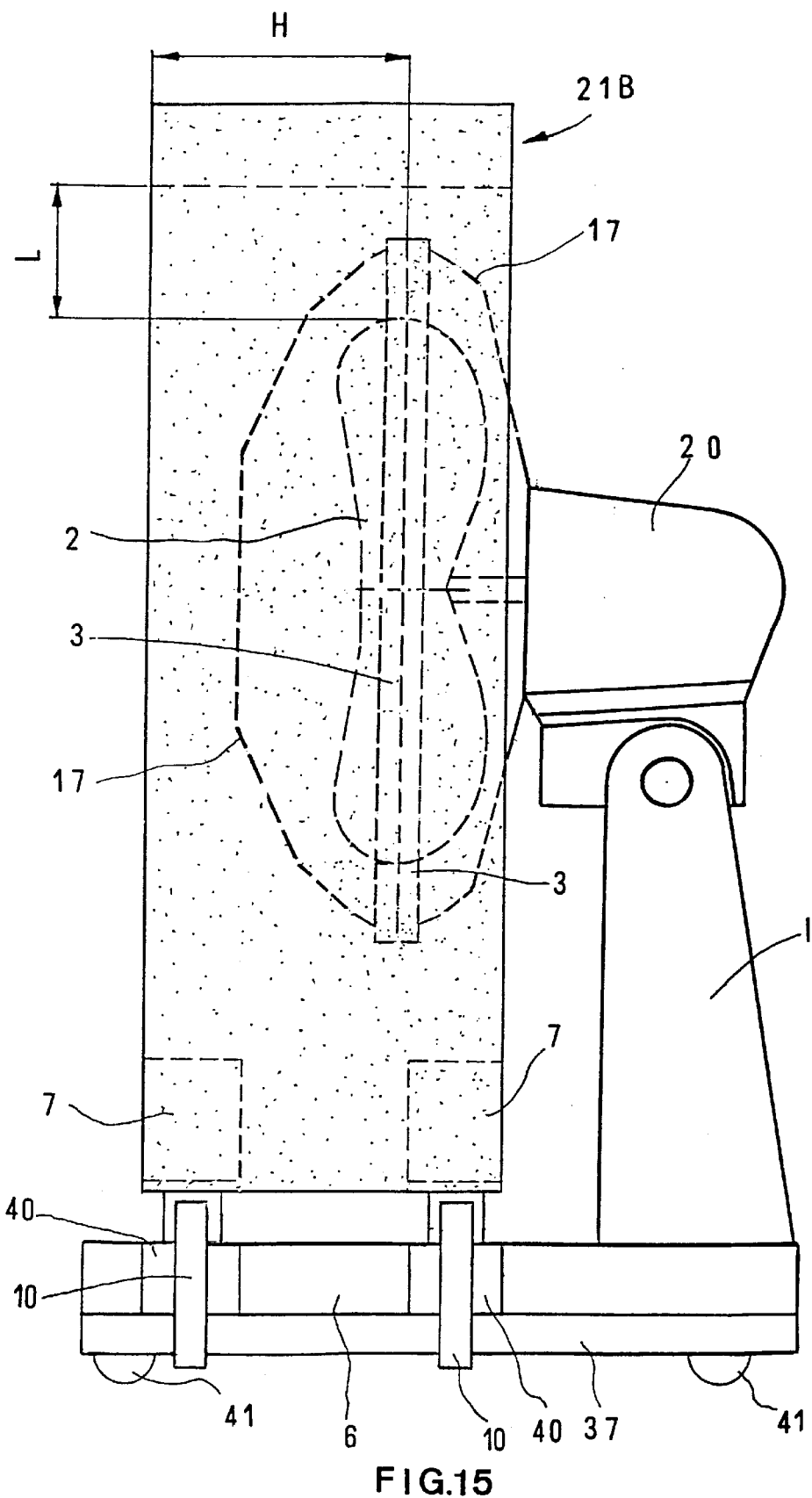
FIG. 15 is the lateral view toward the fan filter with fastening means of FIG. 14, as indicated by the arrow D.

Referring now to FIGS. 14 and 15, there are shown the fan filter 21B with fastening means 16 in accordance with present invention, and the operating fan 15, wherein the fan has a weighted base 6. The weight 37 and the base 6 are attached together and become a stationary element of the fan. The fan filter 21B is attached to this stationary element with help of the fastening means 16, in accordance with present invention. In this case, the weighted base is acting as additional vibration dampening and vibration isolation unit.

There are different ways to secure the base 6 and the weight 37 (about 2 to 8 pounds and more). In the specific case of FIGS. 14 and 15, the weight 37 is attached to fan base 6 with the help of elongated strap portion 10 from fastening means 16. For this goal, the strap portion 10 pass through two holes 38 and 39. The hole 38 is in the part 40 which is fastened (and belong) to the base 6, and the hole 39 is in the weight 37. The weight 37 has the legs 41 for placing the fan filter on the desk, floor, etc.

The filter media 12A, in accordance with present invention, must be placed at distance not less than 0.26 (H) (see Equation 1). But some very old fans are noisy. In this case, the distance L have to be increased. It cannot be more than 2R (preferably from ¾ R to R). That permit considerably lessen the influence of noise which can cause unwanted vibration of the filter media 12B.

Fan filter shown in FIGS. 14 and 15 should be installed at homes where the children live, especially the children sensitive to very small dust allergens and dust mite dropping. The type of the fan filter 21B provide triply protection from vibration: 1. Filter media 12B designed to be placed at definite distance beyond the periphery of primary airflow; 2. Fan filter has to be attached to fan base by the fastening means 16 which are, in the same time, the vibration isolation units; 3. Fan base has additional weight 37 which acting as vibration isolation unit.

There are a great number of hug fans or industrial pedestal fans (see FIG. 16) which already have heavy base 6A (pedestal) weighting about 30 to 45 pounds. This base 6A practically is not subject to vibration of working fan which has height about 3 meters.

Figure 16:
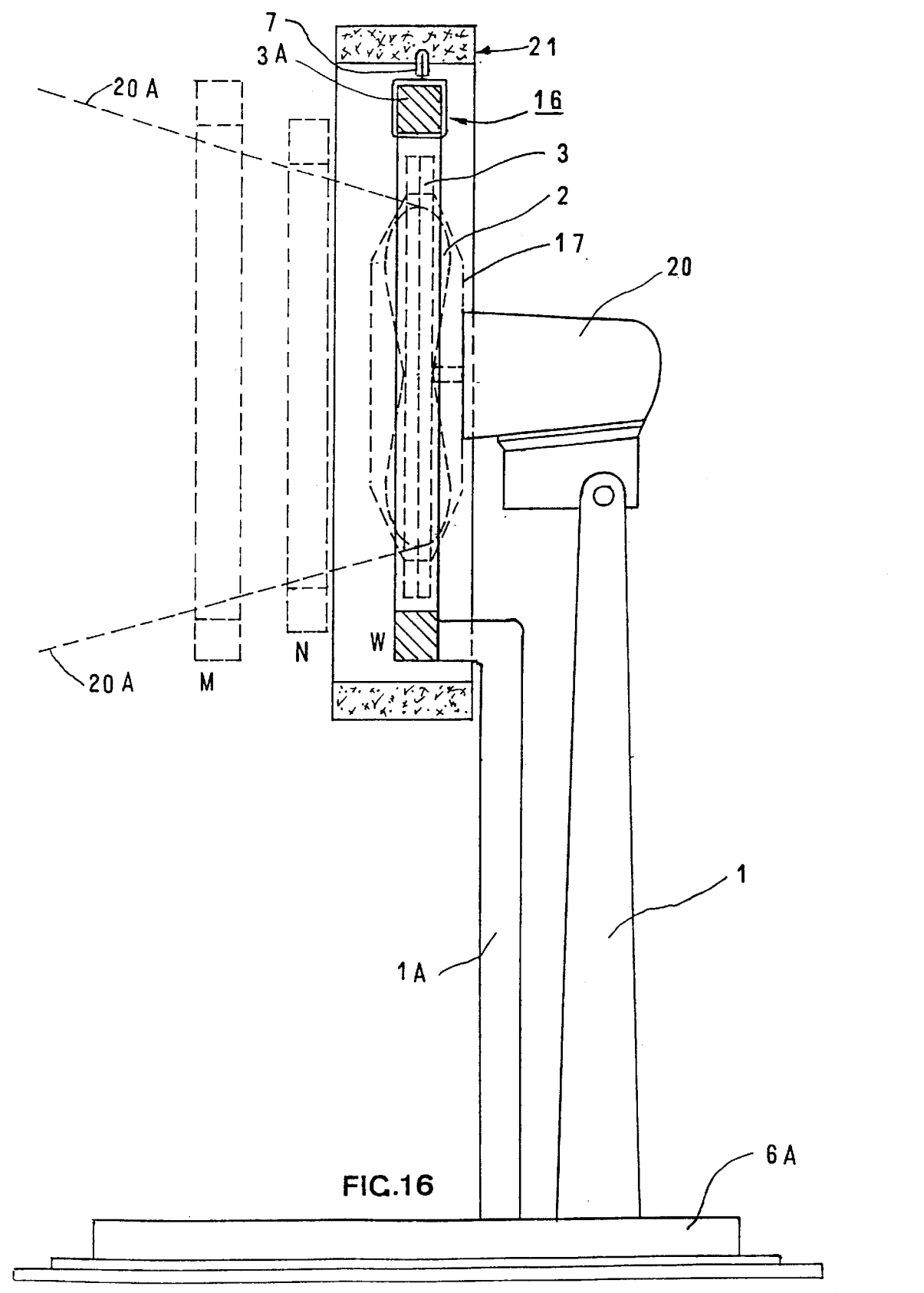
FIG. 16 shows pedestal fan having additional elongated member and additional ring.

FIG. 16 shows pedestal fan 15 having additional elongated stand member 1A and additional ring 3A. One end of the elongated stand member 1A is attached to the base 6A, and another end to the ring 3A. These two parts (6A and 1A) become an additional stationary element of the fan 15. The fan filter 21 is attached to this stationary element with the help of the fastening means 16. The fan filter 21 and the fastening means 16 are described above in detail (see FIGS. 1 to 5). In this case, the heavy base 6A act as an additional vibration dampening and a vibration isolation unit. The ring 3A can be installed on any of three places: W, N or M, depending on the aesthetic requirements. The rest of the designations on the FIG. 16 coincide with the designations on the FIGS. 1 to 5.

In America work more than 100 million ceiling fans. For example, in high school (there are 24,000 in America), only in kitchen there are six huge ceiling fans. These fans raise the dust and move it around. By effect of the air motion the particles of dust, even the small ones, will break into smaller chips because they collide with walls, furniture or even with each other. Small dust particles are extremely hazardous for children. In the school cafeteria (there are 300 seats) and corridors visible dust in air can be seen. Thousands toxic particles permeate what children eat and what they breathe. The children not only get very fine particles in their lungs but they get it into their clothing. Toxic compounds may be absorbed through the skin (see "Rash outbreak Closes R.I. School") The Boston Globe, Apr. 8, 1995).

According to a report of a special legislative Committee of the Commonwealth of Massachusetts fully 50 percent of current health problems are caused by a deteriorated indoor air quality.

There are many patents which propose to use the ceiling fans in conjunction with air filter. But not one of them can be put into practice. For example, as described in the U.S. Pat. No. 4,889,543, a ceiling fan include four blades and four filtering elements which are connected between the blades of the ceiling fan. Every filtering element is interconnected between two adjacent blades of the fan with two or more fastening means—rubber bands. The filtering elements fit snugly to sources of vibration: rotating blades. Therefore, the filtering elements are subject to vibration. As a result, the dust particles held by the filter media will break into smaller chips, because they collide with each other, and very fine particles release into surrounding atmosphere of the classroom, school cafeteria, home, etc.

Similar behavior in a ceiling fan filter, according to U.S. Pat. No. 4,889,543, described above, applies to all our filter devices known in the prior state of the art as well (see, for example, U.S. Pat. No. 4,676,721 and U.S. Pat. No. 4,750,863) Thus, in America, wherever ceiling fans are used the children have a very high risk of getting environmental illnesses: asthma, lead poisoning, depression (which can be responsible for a child's gravitation toward drug use), emotional, behavioral and learning problems.

Therefore, we urgently need an acceptable filtering devices using with ceiling fans to protect children in school and at home.

FIGS. 17 to 20 help provide practical answers to the question relative to filter for ceiling fan in school: how can we fix the schools and homes that are making our children sick because of deteriorated indoor air quality?

FIGS. 17 to 20 show that acceptable filter devices for filtering air in a room equipped with a ceiling fan can be developed in accordance with U.S. Pat. No. 5,641,340 and present invention. That is when the fan filter 21C is positioned beyond the primary turbulent airflow and has improved fastening means which are, at the same time, the vibration isolation units 16, described in detail in FIGS. 1 to 5.

Figure 17:
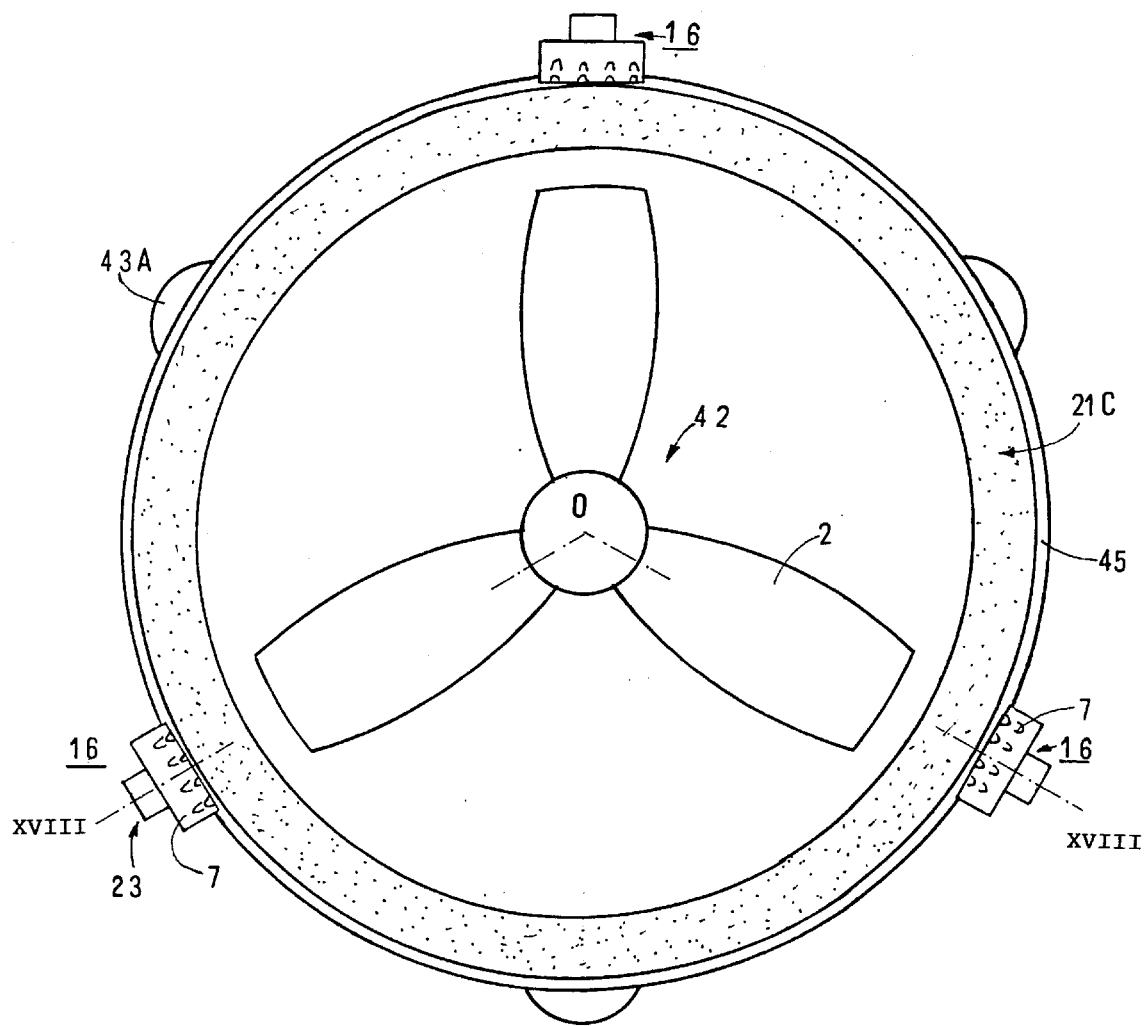
FIG. 17 is a bottom view showing the fan filter in form of a ring with fastening means to use in conjunction with a ceiling fan.

FIG. 17 is a bottom view showing the fan filter in form of a ring with fastening means to use in conjunction with a ceiling fan.

Figure 18:
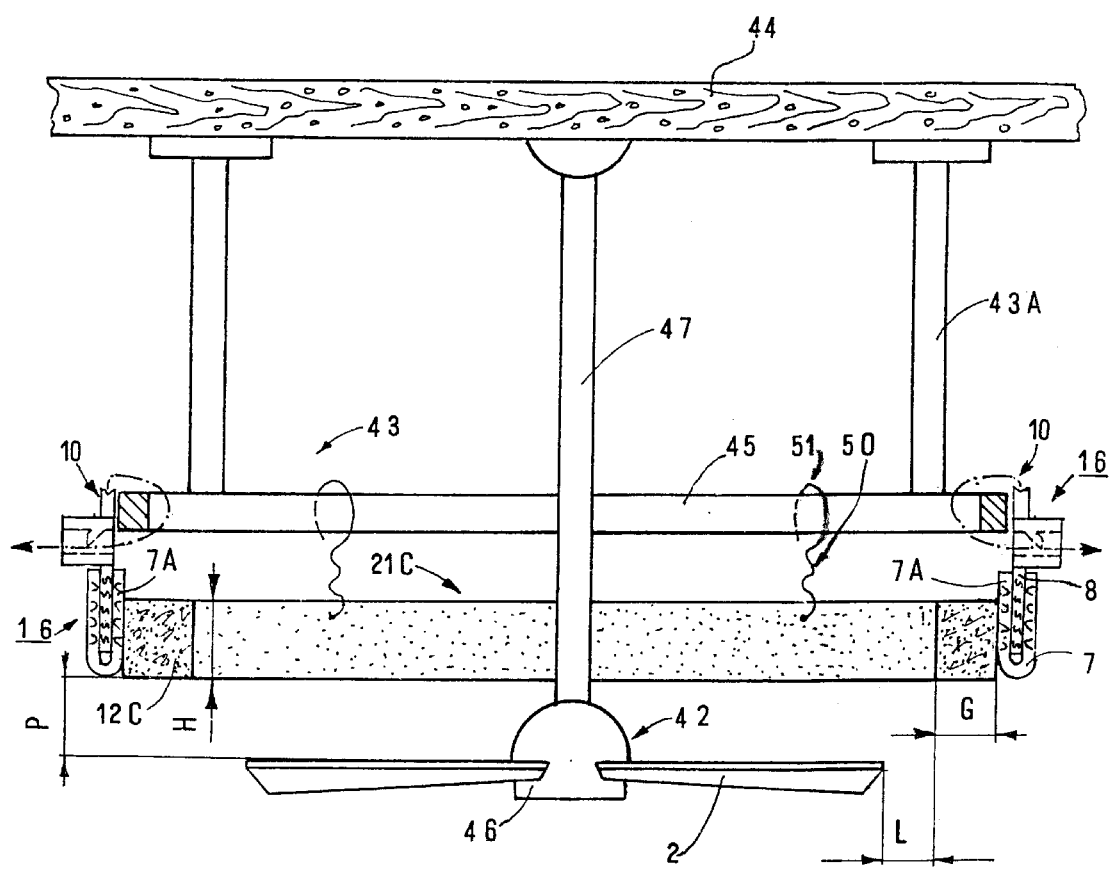
FIG. 18 is a sectional view taken along line XVIII—O—XVIII of FIG. 17 showing the fan filter in form of a ring mounted over a ceiling fan.

FIG. 18 is a sectional view taken along line XVIII—O—XVIII of FIG. 17 showing the fan filter in form of a ring mounted over a ceiling fan.

The ceiling fan 42, which includes a motor 46, blades 2, a tubular conduit 43A and a fan filter 21C, does not have structural features in comparison with fan 15 and fan filter 21 shown above in FIGS. 1 to 5.

FIG. 18 show that fan filter 21C is disposed above a ceiling fan 42 at distance P which is approximately from 3 to 5 centimeter, with the aid of fastening means 16 described in detail above (FIGS. 1 to 5). Such disposition is necessary because some ceiling fans have vibration with big amplitude as a result of wear and tear of the electric motor bearings, disbalance or biting of blades 2 (sometime having diameter 54" and more), when pollution sticks to them, periodic pulsations of pressure made by the blades 2 when rotating. All this can broke the filter 21C and fan blades 2, because they can touch each other.

The fastening means 16 can be attached to the ceiling 44 by means of the hanger-bracket 43 having 1 to 3 elongated members 43A and ring 45. Three elongated members 43A are attached to the ceiling 44 at one end and to the ring 45 at the other. Fastening means 16 are securely fixed to ring 45 by means of a straps 10 in the same manner as illustrated and described in particular detail above in FIG. 2.

Width H, thickness G and appropriate material of the filter media 12C are determined as described in detail above for a fan filter shown in FIGS. 1 to 6. Every loop-threaded sheets 7 have portion. 7A which are attached to filter media 12C (sewn or glued) to his external side. Loop-threaded sheets 7 of the fan filter 21C and hook-threaded sheets 8 of the fastening means 16 are coupled together as shown in FIG. 18. If filter media 12C is not strong enough to self supporting, it can be strengthened with light wire framework.

The distance L can be calculated correctly on condition that the fan filter media 23C is disposed above the ceiling fan at distance P and its width is H.

$$L = 0.26\ (P+H) \qquad \text{Equation 2}$$

(See explanation of FIG. 2 and Equation 1).

Sometimes, a ceiling fan has to be decoration of interior. The fan filter 21C in form of ring using in conjunction with ceiling fan should be too bulky.

Figure 19:
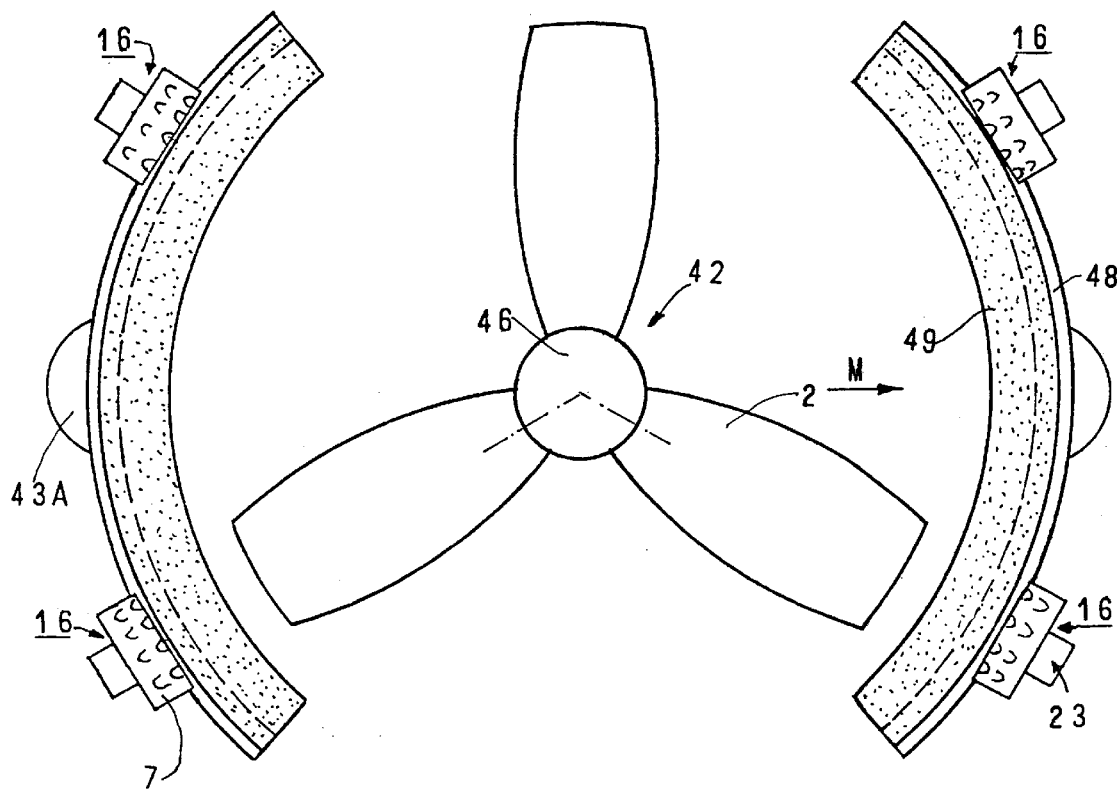
FIG. 19 is a bottom view showing the fan filter in form of two parts of ring in conjunction with a ceiling fan, taken into account the aesthetic requirements.
Figure 20:
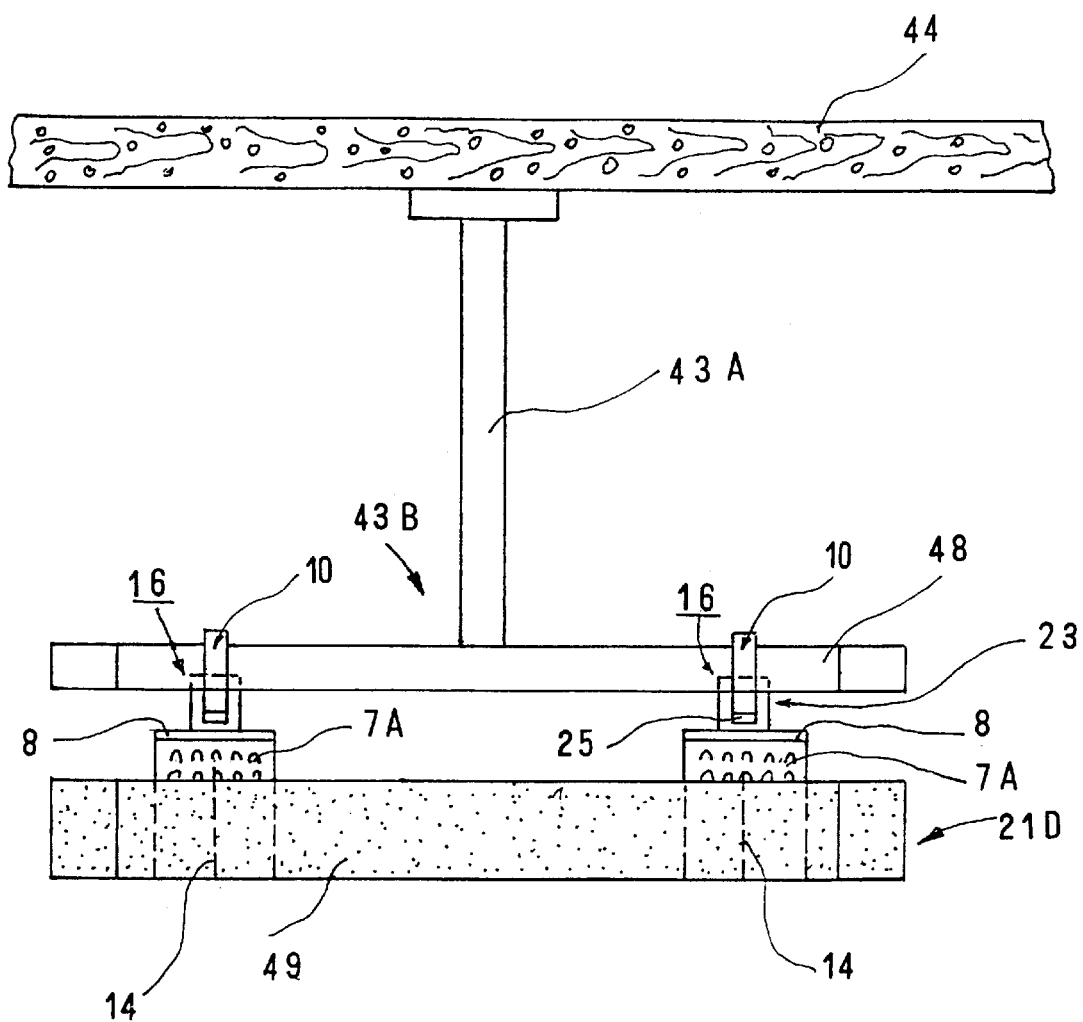
FIG. 20 is a fragmentary lateral view toward one part of the fan filter of FIG. 19, as indicated by the arrow M.
Figure 21:
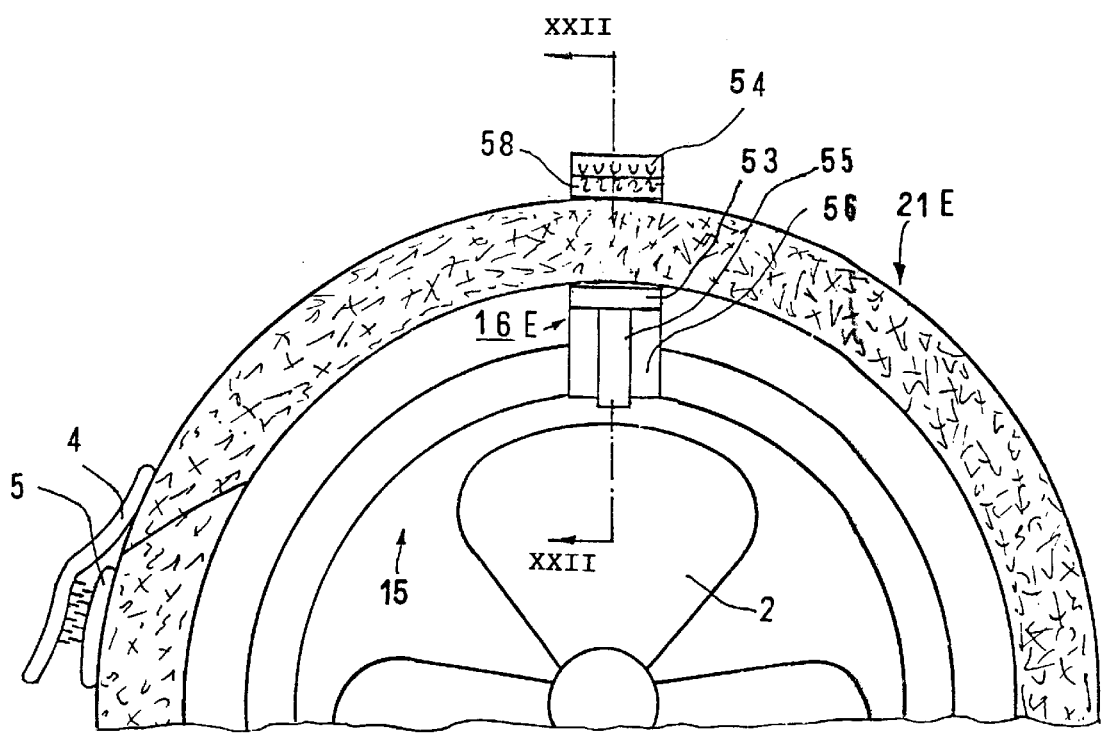
FIG. 21 is a fragmentary view of the fan filter with fastening means of the fifth modification, installed on a conventional fan.

In this case, it is advantageous to make the fan filter in form of two parts of ring. FIG. 19 is a bottom view showing the fan filter in form of two parts of ring, taken into account the aesthetic requirements. FIG. 20 is a fragmentary lateral view toward one part of fan filter of FIG. 19 as indicated by the arrow M.

Every part of filter media 49 has two loop-threaded sheets 7. Every loop-threaded sheet 7 has portion 7A attached to filter media 49 (sewn, it is shown in doted line 14, or glued in the same manner as illustrated in FIG. 18). The two fastening means 16 attached to ceiling 44 by the mean of hanger-bracket 43B. Hanger-bracket 43B has elongated member 43A and one part of the ring 48. Elongated member 43A attached to the ceiling 44 at one end and to the part of ring 48 at the other end. Fastening means 16 are securely fixed to the parts of ring 48 with the aid of straps 10. Every loop-threaded sheet 7 of the filter 21D and hook-threaded sheet 8 of fastening means 16 when pressed together, form a strong joint. This joint permit to provide a fan filter which is quickly and easily removable from the ceiling fan, permit the fan filter to be readily cleaned or replaced (in schools, offices, homes, hospitals, etc.). Suspension of a ceiling fan filter must be safe. It is recommended, when making part 7 and fastening mean 16, to use Heavy Hold It Velcro fasteners (hold up 10 pounds on square inch) and universal cable and wire markers Number 278-1640 (see Catalog Radio Shack).

For extra safety, it is recommended to use, for filters 21C and 21D, a easy detached soft mounting to secure the filter to ring 45 or to part of ring 48. Suspension do not have to impede the work of the fastening means 16. For example, devices comprising a chain 50 attached to fan filter 21C and a hook 51 attached to ring 45 can provide extra safety.

The fan filter with operating fan and fastening means of fifth modification are shown in FIGS. 21 to 25. They comprise a conventional fan 15 which is described in FIGS. 1 to 5, 12; fan filter 21E with rectangular slot 60 having a filter media 12E which width is H measured in direction parallel to primary airflow axis, cover 22, and hook-threaded sheet 58 with rectangular slot 59. Each fastening means 16E comprises: a strap 10E and a cushion 56 made from foam which damp vibration. Strap 10E includes an enlarged head portion 53 having rectangular slot 57, elongated portion 55, both made from flexible plastic materials, and loop-threaded sheet portion 54 attached to elongated portion 55 or manufactured with part 55 as injection molded, one piece unit; cushion 56 made from foam in which vibration is damped. Cushion 56 has a slot 61 extending from its outer periphery to its central area to permit the foam cushion 56 to be slipped over the two guard rings 3.

Figure 22:
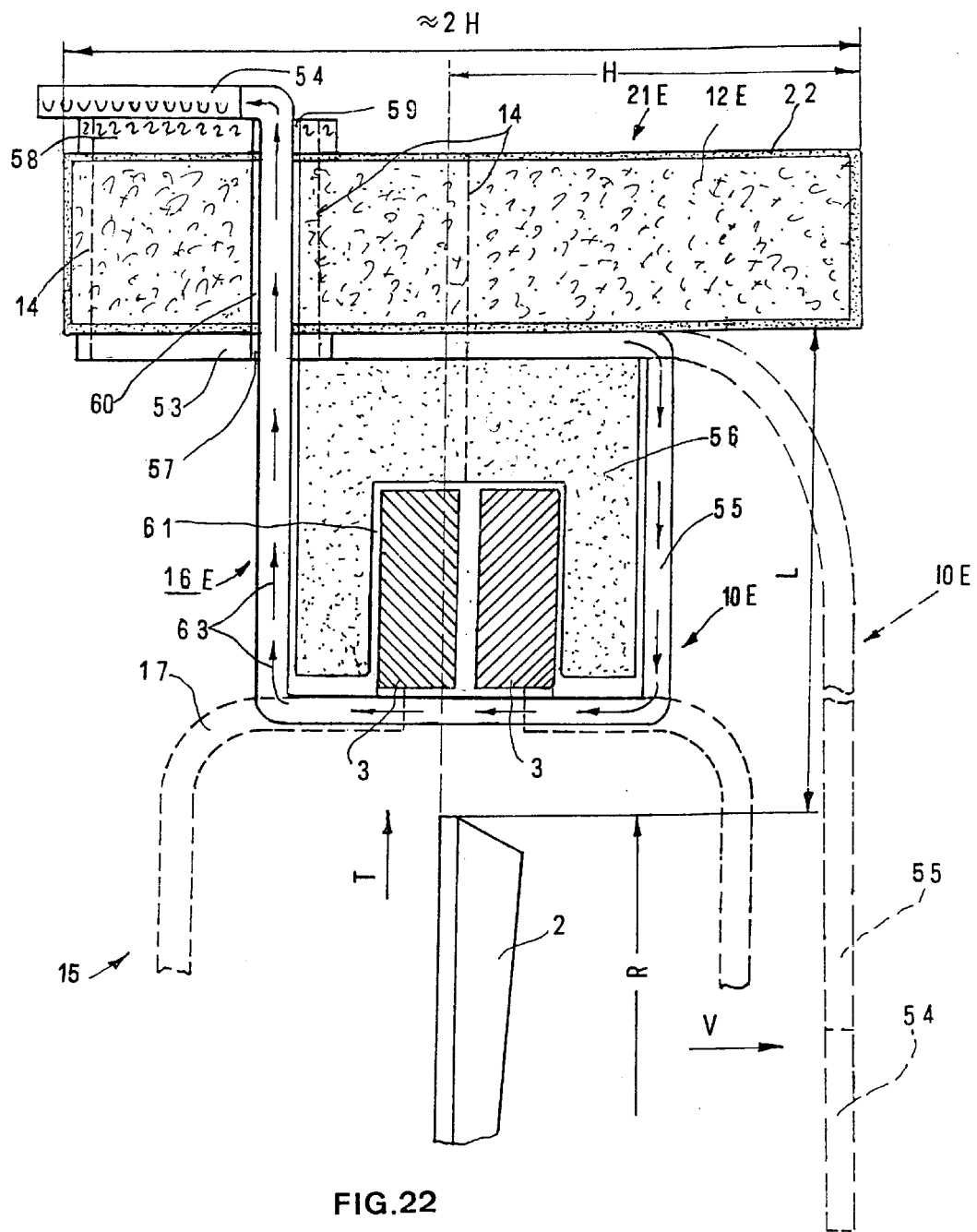
FIG. 22 is a enlarged fragmentary cross-sectional view taken along lines XXII—XXII of FIG. 21 showing the upper portion of the fan filter with fastening means, such that fastening means in its closed position.
Figure 23:
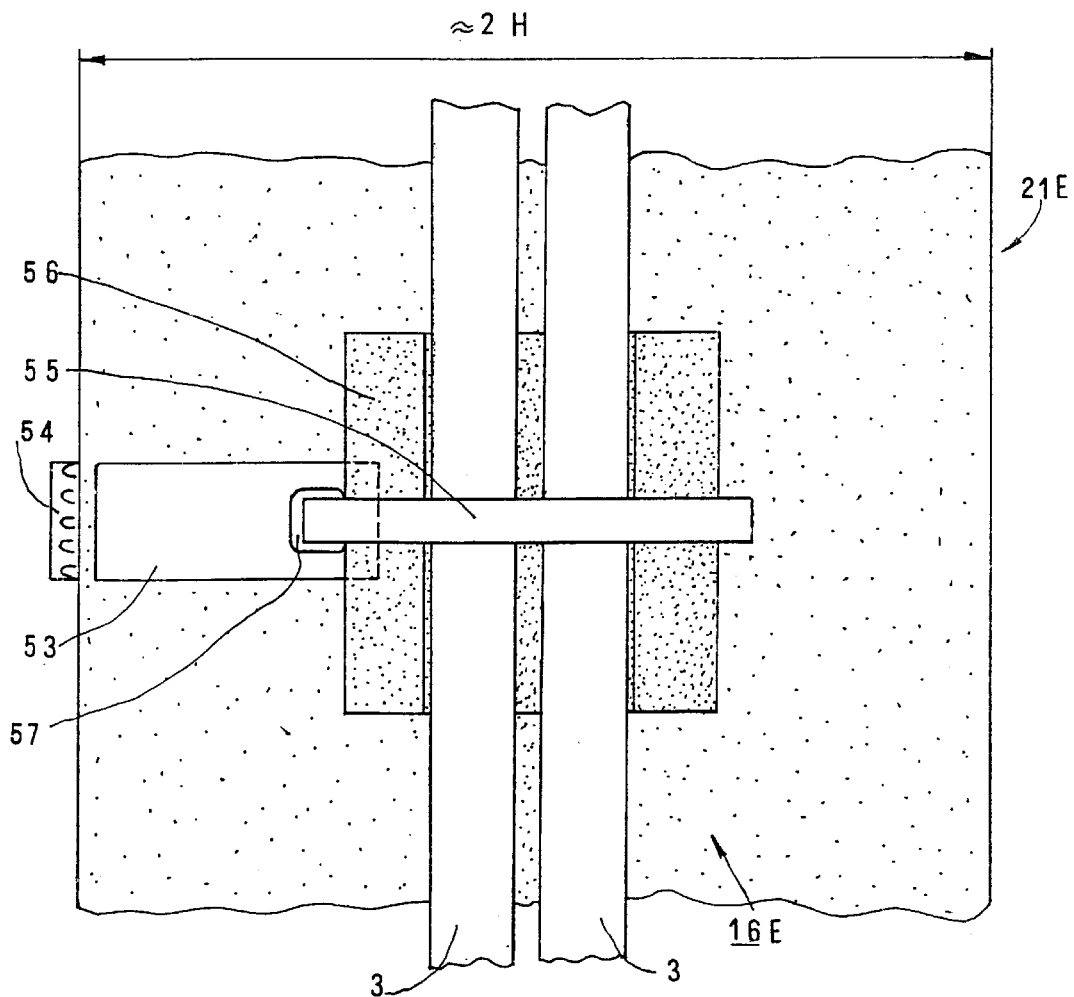
FIG. 23 is a bottom view toward the fan filter with fastening means, as indicated by the arrow T of FIG. 22.
Figure 24:
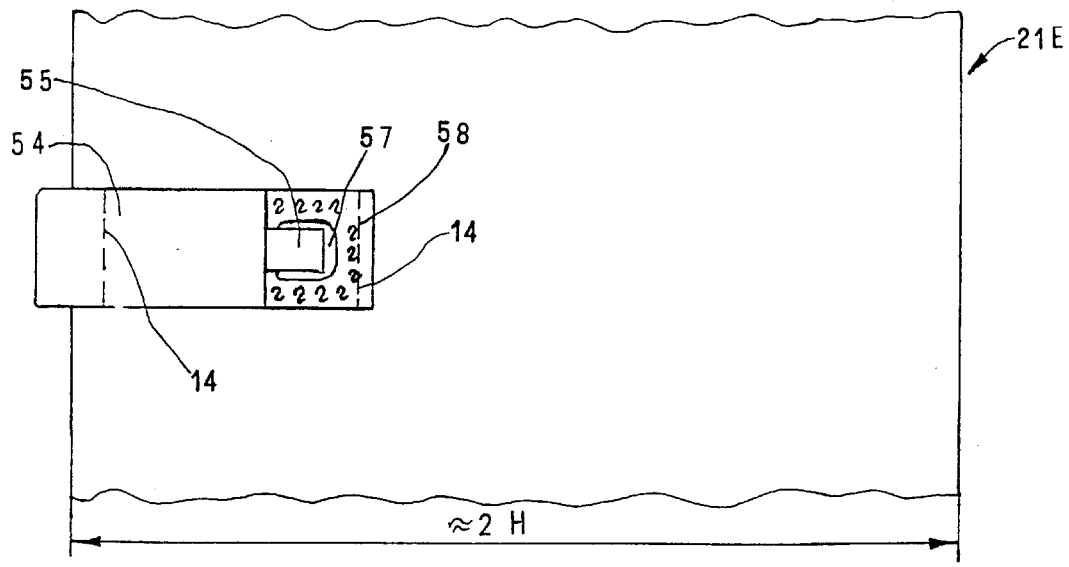
FIG. 24 is a fragmentary top plan view of the fan filter with fastening means of the fifth modification.
Figure 25:
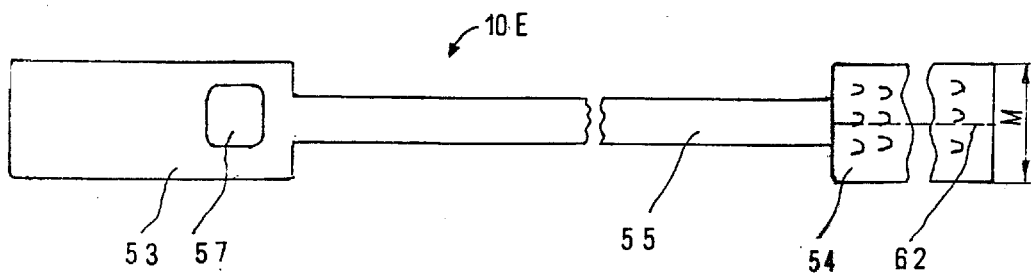
FIG. 25 is a top plan view of the strap belonged to fastening means of the fifth modification, in its open position.

For assemble a fan filter with fastening means 16E, which comprises 4 units: 21E, 10E, 56 and 58, and secure it, it is necessary, at first, to put them together, as it is shown in the left top corner of the FIG. 22, and sew them by three separated seams, as it is shown by the dotted line 14. It should be noted that in FIG. 22 as in all other Figures of this specification, the deformation of material when sewing is omitted for clarity. Filter media 12E can be sometime cased by net 22, made usually from curtain lace. The sewing operation with four units of fan filter with fastening means must be performed in 3 to 8 places on the filter media depending of dimension of a fan filter: for 6" fan on three places; for 12" to 18" fan on six places; and for 30" pedestal fan on eight places.

Then, the fan filter 21E with fastening means 16 is put on the fan, in the way that every foam cushion 56 slip over two rings of the fan's protective cage (not shown) with the help of slots 61 of the cushions. With that, the not sewn part of the strap 10E, comprising portion 55 and loop-threaded sheet 54, drop, as it is shown by the dotted lines in the right side of FIG. 22.

After this, the loop-threaded sheet 54 is folded along the dotted line 62 (FIG. 25), and the elongated portion 55 of the strap 10E is extended through three rectangular slots (holes) 57, 60 and 59. Direction of the movement of the strap 10E is shown by multiple arrows 63 (FIG. 22). When loop-threaded sheet 54 will go out from slot (hole) 59 to exterior surface of the fan filter 21E, it must be straightened and pulled slightly for fastening fan filter 21E with cushion 56 to guard rings 3. Straightened loop-threaded sheet 54 has to be pressed to hook-threaded sheet 58 for attach one of the parts of fan filter 21E to rings 3.

Every rectangular slot 57, 59 and 60 has a side less than side M of the loop-threaded sheet 54. Therefore, the folded loop-threaded sheet 54 permits easy movement of the part 55 of strap 10E through three small slots 57, 59 and 60 in the insertion direction (shown by multiple arrow 63) and prevents movement of the strap 10E in a withdrawal direction opposite the insertion direction when the loop-threaded sheet 54 is straightened just after passing through three slots.

The definitive attachment of the loop-threaded sheet 55 (that is to say of the strap 10E) take place when it is pressed together with hook-threaded sheet 58 on the exterior surface of fan filter 21E.

Fastening means, in accordance with this invention see FIGS. 1 to 5; 17, 18), have elongated form. In some cases it has to be taken into account when we have to determine distance L.

Figure 26:
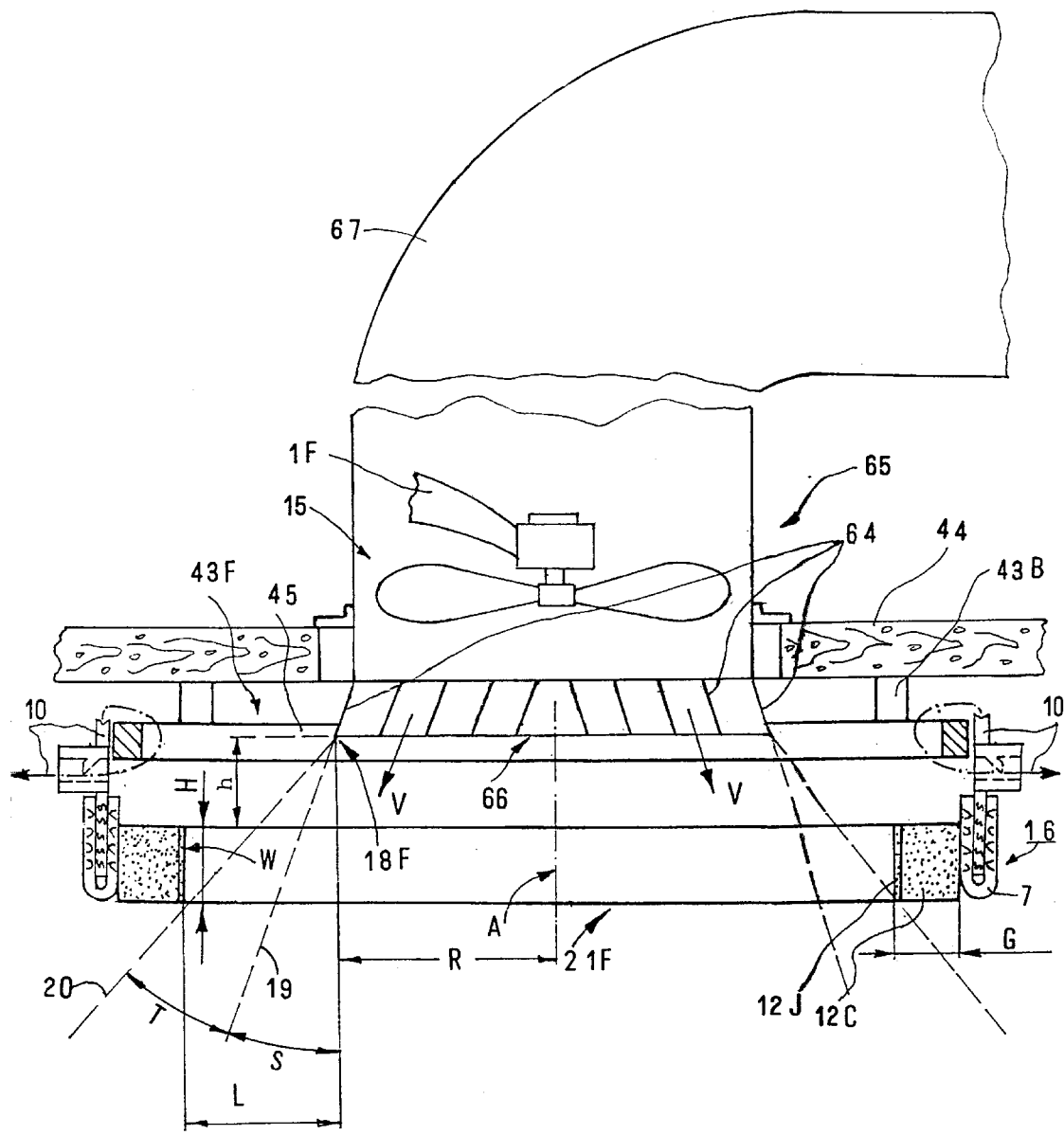
FIG. 26 is a cross-sectional view of a diffusor grill downstream of fan in a ceiling duct, the diffusor grill having a filter spaced therefrom by fastening means of the invention attached to an intermediate hanger bracket.

FIG. 26 shows the way to adapt the fastening means from FIGS. 1 and 2 or 17 and 18 to diffusor 65 (there are 1,5 billion in America) and what change we have to make for determine distance L, taking into account the height of fastening means 16.

FIG. 26 shows diffusor 65 in section which has diffusor grill 66 with inclined vanes 64. Airflow goes out at angle 15° to 30° to perpendicular A to the floor.

Diffusor's fan filter 21C (exactly the same as described in FIGS. 17 and 18 ), having filter media 12C and loop-threaded sheet 7, is positioned below grill 66 at distance h+H (where h is a part of the height of fastening means 16), with the aid of fastening means 16 described in detail above (FIGS. 1 to 5). The fastening means 16 can be attached to the ceiling 44 by mean of the hanger-bracket 43F having three elongated members 43B and ring 45. Three elongated members 43 are attached to the ceiling 44 at one end and to the ring 45 at the other end. Fastening means 16 are securely fixed to ring 45 by mean of a strap 10 in the same manner as illustrated and described above in FIGS. 1 to 5.

Since fan 15 with elongated stand member 1 can be placed at different distances from outlet of airflow into the room in direction shown by arrows V, the calculation of the distance L must be done from lower perimeter of the diffusor outlet 66 (with radius R or rectangular). In this case, point 18F in FIG. 26 is disposed on this perimeter. A part of the height of fastening means 16 is marked by h. Since h is parallel to axis A of the airflow V, it must be added to a quantity of the width H of the fan filter 21F.

Besides, as we had mentioned it above, the airflow from diffusor outlet 66 of diffusor 65 goes out not in a perpendicular direction A to the floor, but makes an angle S=15° to 30° with this perpendicular, due to inclination of vanes 64. Therefore, it is necessary to increase the distance L, because, in this case, the airflow will be more widen.

This reasoning reduce the Equation 1 to the following form:

$$L \geq tgT(h+H) + tgS(h+H)$$

or $$L \geq 0.26(h+H) + tgS(h+H) \qquad \text{Equation 2}$$

Here T is the angle of the airflow's expansion ( measured between lines 20 and 19), equal to 15°; S is the angle between the inclined surface of the vane 64 and the perpendicular A to the floor.

Equation 2 gives the value of distance L for diffusor 65 shown in FIG. 26.

Additional explanation of some designations in FIG. 26 follows:

h is a part of height of the fastening mean 16;

H is the width of the fan filter 21F;

G is the thickness of the fan filter 21F;

12J is a plastic screen which is needed in case when the filter media 12C is not strong enough to be self-supporting.

1F is elongated stand member for securing fan 15 which create primary airflow, to stationary element of diffusor or duct 67.

L is distance at which the fan filter 21F must be placed from the lower exterior perimeter of the grill 66 (point 18 in FIG. 26 belong to this perimeter) to interior surface W of the fan filter 21F; L being measured perpendicularly to the primary airflow axis A.

For choosing an appropriate material for all air filters of this specification and determining the width H and the thickness G of the filter media, it is necessary to use a technical data sheet obtained from manufacturers as that was described above in the explanation of FIGS. 1 and 2, and in prior U.S. Pat. No. 5,641,341.

Having described the invention, what is claimed is:

1. In combination a fan air filter with an operating fan and fastening means for fastening the air filter to the operating fan, said fan filter with operating fan comprising: an operating fan having a base, a protective cage with bars and guard rings, blades, a drive motor to create a primary airflow within an enclosed space, an elongated stand member secured to said motor at one end, and to the base at the other end; a filter media having a width H measured in direction parallel to a primary airflow axis, said filter media being placed at distance L beyond the periphery of said fan blades, L being measured perpendicularly to the primary air-flow axis, where L is not less than 0.26(H); at least one loop-threaded sheet or hook-threaded sheet secured to a surface of said filter media;

each said fastening means comprising: a hook-threaded sheet or loop-threaded sheet secured to a stop zone end of an elongated strap member, said stop zone end including an enlarged head portion having a rectangular slot with at least one tooth shaped stop means; said elongated strap member having an elongated strap portion extending from the stop zone end, said elongated strap portion having a free end opposite the stop zone end, the elongated strap portion having a plurality of equally spaced stop elements on at least one side thereof, said tooth shaped stop means serving to engage one of the plurality of stop elements arresting said strap portion when the strap portion is extended through said rectangular slot after said strap portion is attached or wrapped around either a stationary element of the enclosed space or to a stationary element of said fan; said elongated strap member further including a tail portion on a free end of said elongated strap portion to facilitate easy initial insertion of said elongated strap portion into the rectangular slot of said enlarged head portion.

2. The fan filter with fastening means according to claim 1, wherein the hook-threaded sheet or loop-threaded sheet, enlarged head portion, elongated strap and tail portions, are injection molded as a one piece unit from plastic material.

3. The fan filter with fastening means according to claim 1, wherein the filter media includes activated carbon either alone or in combination with a bacteriostatic media.

4. The fan filter with operating fan and fastening means according to claim 1, wherein said air filter is attached, by said fastening means to said base of said operating fan for the purpose of reducing vibration of the fan filter.

5. The fan filter with operating fan and fastening means according to claim 1, wherein said operating fan has a weighted base; the weight and said base are attached together and become said stationary element of the fan to which said fan filter is attached by said fastening means; the weighted base acting as an additional vibration dampening and vibration isolation unit.

6. The fan filter with operating fan and fastening means according to claim 1, wherein said operating fan includes an additional elongated stand member and an additional ring; one end of said elongated stand member is attached to said fan base, and other end is attached to said ring; said ring being an additional stationary element of said fan; said fan filter is attached to said additional stationary element by said fastening means for purpose of reducing vibration of the filter.

7. The fan filter with operating fan and fastening means according to claim 1, wherein said hook-threaded sheet or loop-threaded sheet from said fastening means has a mushroom-shaped form.

8. In combination a fan air filter with operating fan and fastening means for fastening the air filter to the operating fan; said fan filter with operating fan comprising: an operating fan having a base, a protective cage with bars and guard rings, blades, a drive motor to create a primary airflow within an enclosed space, an elongated stand member secured to said motor at one end, and to the base at the other end; a filter media having a width H measured in direction parallel to a primary airflow axis, said filter media being placed at distance L beyond the periphery of said fan blades, L being measured perpendicularly to the primary airflow axis, where L is not less than 0.26(H); at least one loop-threaded sheet or hook-threaded sheet secured to a surface of said filter media;

said each fastening mean comprising: a hook-threaded sheet or loop-threaded sheet including a hook-threaded surface portion or a loop-threaded surface portion and a knitted back portion, each said hook-threaded sheet or loop threaded sheet being folded into two equal halves and wrapped around a respective guard ring in a direction perpendicular to the primary airflow axis such that the two equal hook-threaded or loop-threaded surface portion halves face out and the two equal knitted surface portion halves face inward toward one another, said two equal knitted surface portion halves being attached together with one of elastic bonding adhesive, staples or hook and loop fasteners, said loop-threaded sheet or hook-threaded sheet from said filter media and a hook-threaded sheet or loop-threaded sheet from said fastening means when pressed together serving to secure said filter media to the operating fan and to isolate said fan filter from vibrations of the operating fan.

9. In combination a fan air filter with an operating ceiling fan attached to a ceiling and fastening means for fastening the air filter to the operating fan; said fan filter with operating ceiling fan comprising: an operating ceiling fan having a tubular conduit, motor with rotatable blades extending radially to create a primary airflow within an enclosed space, a filter media having a width H measured in direction parallel to a primary airflow axis, said filter media being placed at distance L beyond the periphery of said fan blades and above said operating ceiling fan at distance P of approximately 3 to 5 centimeters, L being measured perpendicularly to the primary airflow axis, where L is not less than 0.26(H+P); at least one loop-threaded sheet or hook-threaded sheet secured to the exterior surface of said fan filter;

said each fastening means comprising: a hook-threaded sheet or loop-threaded sheet secured to a stop zone end of an elongated strap member, said stop zone end including an enlarged head portion having a rectangular slot with at least one tooth shaped stop means; said elongated strap member having an elongated strap portion extending from the stop zone end, said elongated strap portion having a free end opposite the stop zone end, the elongated strap portion having a plurality of equally spaced stop elements on at least one side thereof, said tooth shaped stop means serving to engage one of the plurality of stop elements arresting said strap portion when the strap portion is extended through said rectangular slot after said strap portion is attached to a hanger bracket attached to the ceiling, said hanger bracket having at least one elongated stand member and one ring, said at least one elongated stand member being attached to ceiling at one end and to said ring at the other end; said elongated strap member further including a tail portion on a free end of said elongated strap portion to facilitate initial insertion of said elongated strap portion into the rectangular slot of said enlarged head portion.

10. In combination a fan air filter with an operating fan and fastening means for fastening the air filter to the operating fan; said fan filter with operating fan comprising: an operating fan having a base and guard rings, blades, a drive motor to create a primary airflow within an enclosed space an elongated stand member secured to said motor at one end, and to the base at the other end; a fan filter media having a rectangular slot for passage of fastening means therethrough, said filter media having a width H measured in direction parallel to a primary airflow axis, said filter media being placed at distance L beyond the periphery of said blades, L being measured perpendicularly to the primary airflow axis, where L is not less than 0.26(H), said filter media further including a cover and hook-threaded sheet or loop-threaded sheet having a rectangular slot therethrough attached on an exterior surface of the filter media;

each said fastening means comprising: a strap and a foam cushion to dampen vibration, said strap including an enlarged flexible plastic head portion having a rectangular slot, an elongated flexible plastic part, and a hook-threaded sheet portion or a loop-threaded sheet portion attached to said elongated part, said cushion having a slot extending from its outer periphery to its central area to permit said cushion to be slipped over said guard rings, said filter media being attached to the operating fan by passage of said strap around the cushion and guard rings and through the rectangular slot in the enlarged head portion, said hook-threaded sheet portion or a loop-threaded sheet portion attached to said elongated part of said strap mating with the hook-threaded sheet or loop-threaded sheet having the rectangular slot therethrough which is attached on the exterior surface of the filter media.

11. In combination a fan filter with a ceiling diffusor, an operating fan and fastening means for fastening the air filter to a hanger bracket, the hanger bracket being attached to the ceiling adjacent to the ceiling diffusor; said fan filter with diffusor and operating fan comprising: an operating fan having blades with a drive motor to create a primary airflow passing through a diffusor outlet within an enclosed space, an elongated stand member secured to said motor at one end and to an interior surface of a duct at the other end; said duct attached to a source of air at one end and to said diffusor outlet at the other end, said diffusor outlet having inclined vanes from which air flows out at angle relative to the primary airflow; a fan filter media having a width H measured in direction parallel to a primary airflow axis, and at least one loop-threaded sheet or hook-threaded sheet secured to a surface of said fan filter;

each said fastening means comprising: a hook-threaded sheet or loop-threaded sheet secured to a stop zone end of an elongated strap member, said stop zone end including an enlarged head portion having a rectangular slot with at least one tooth shaped stop means; said elongated strap member having an elongated strap portion extending from the stop zone end, said elongated strap portion having a free end opposite the stop zone end, the elongated strap portion having a plurality of equally spaced stop elements on at least one side thereof, said tooth shaped stop means serving to engage one of the plurality of stop elements arresting said strap portion when the strap portion is extended through said rectangular slot after said strap portion is attached to said hanger bracket having at least one elongated stand member and one ring; said at least one elongated stand member being attached to said ceiling at one end and to said ring at the other end; said elongated strap member further including a tail portion on a free end of said elongated strap portion to facilitate initial insertion of said elongated strap portion into the rectangular slot of said enlarged head portion;

an interior surface of said fan filter being placed at distance L beyond the perimeter of a lower part of said ceiling diffusor outlet and being mounted at distance h below the outlet, distance L being measured perpendicularly to the axis of primary airflow, where L is not less than determined by the following equation:

$$L \geq 0.26(h+H)+tgS(h+H)$$

where h is the distance between the diffusor outlet and the top of the fan filter, H is the width of the fan filter, t is the angle of the air flow expansion, and S is the angle between the inclined surface of vanes of the diffusor and vertical; said loop-threaded sheet or hook-threaded sheet on the surface of the fan filter and said hook-threaded sheet or loop-threaded sheet on the fastening means, when pressed together serve to secure said fan filter and isolate said fan filter from vibration.

* * * * *